(12) United States Patent
Quintens

(10) Patent No.: US 8,034,541 B2
(45) Date of Patent: *Oct. 11, 2011

(54) PROCESS FOR PRODUCING A NON-TRANSPARENT MICROVOIDED SELF-SUPPORTING FILM

(75) Inventor: Dirk Quintens, Westerlo (BE)

(73) Assignee: Agfa-Gevaert N.V., Mortsel (BE)

( * ) Notice: Subject to any disclaimer, the term of this patent is extended or adjusted under 35 U.S.C. 154(b) by 1028 days.

This patent is subject to a terminal disclaimer.

(21) Appl. No.: 11/866,093

(22) Filed: Oct. 2, 2007

(65) Prior Publication Data

US 2008/0254396 A1    Oct. 16, 2008

Related U.S. Application Data

(60) Provisional application No. 60/850,512, filed on Oct. 10, 2006, provisional application No. 60/850,511, filed on Oct. 10, 2006, provisional application No. 60/908,526, filed on Mar. 28, 2007, provisional application No. 60/908,536, filed on Mar. 28, 2007, provisional application No. 60/908,542, filed on Mar. 28, 2007, provisional application No. 60/908,545, filed on Mar. 28, 2007.

(30) Foreign Application Priority Data

| Oct. 3, 2006 | (EP) | 06121665 |
| Oct. 3, 2006 | (EP) | 06121669 |
| Mar. 27, 2007 | (EP) | 07104947 |
| Mar. 27, 2007 | (EP) | 07104948 |
| Mar. 27, 2007 | (EP) | 07104950 |
| Mar. 27, 2007 | (EP) | 07104953 |

(51) Int. Cl.
    *B32B 3/26* (2006.01)

(52) U.S. Cl. ........ 430/311; 430/536; 430/964; 430/330; 428/315.5; 428/304.4; 428/327; 428/480; 428/500

(58) Field of Classification Search ........... None
    See application file for complete search history.

(56) References Cited

U.S. PATENT DOCUMENTS

| 3,755,499 A | 8/1973 | Heijo et al. |
| 5,156,709 A | 10/1992 | Mammino et al. |
| 5,457,018 A | 10/1995 | Sommer et al. |
| 7,498,125 B2 * | 3/2009 | Quintens ............. 430/536 |

FOREIGN PATENT DOCUMENTS

| EP | 0 654 503 A2 | 11/1993 |
| EP | 0 606 663 A | 7/1994 |
| EP | 1 291 155 A | 3/2003 |
| WO | WO 94/04961 A | 3/1994 |

OTHER PUBLICATIONS

European Search Report, Application No. EP 07 10 4950, dated Aug. 31, 2001.

* cited by examiner

*Primary Examiner* — Daborah Chacko Davis
(74) *Attorney, Agent, or Firm* — Leydig, Voit & Mayer, Ltd.

(57) ABSTRACT

A process for producing a non-transparent microvoided self-supporting film comprising the steps of: i) mixing at least one linear polyester having together monomer units consisting essentially of terephthalate, isophthalate and aliphatic dimethylene with the molar ratio of isophthalate monomer units to terephthalate monomer units being at least 0.02 to provide a linear polyester matrix; at least one amorphous high polymer with a higher glass transition temperature than the glass transition temperature of said linear polyester matrix and/or at least one crystalline high polymer having a higher melting point than the glass transition temperature of said linear polyester matrix; and optionally at least one ingredient from the group of ingredients consisting of inorganic opacifying pigments, whitening agents, UV-absorbers, light stabilizers, antioxidants, flame retardants and colorants in a kneader or an extruder; ii) forming the mixture produced in step i) in a thick film followed by quenching; iii) longitudinally stretching the thick film at a stretching force of >4 N/mm$^2$ to at least twice the initial length; and iv) transversely stretching the longitudinally stretched film from step (iii) to at least twice the initial width; the use of the non-transparent microvoided axially stretched film produced according to the above-described process as a synthetic paper; and the use of the non-transparent microvoided axially stretched film produced according to the above-described process image recording elements.

18 Claims, No Drawings

PROCESS FOR PRODUCING A NON-TRANSPARENT MICROVOIDED SELF-SUPPORTING FILM

CROSS-REFERENCE TO RELATED PATENT APPLICATIONS

This application claims the benefit of U.S. Provisional Application No. 60/850,512 filed Oct. 10, 2006, U.S. Provisional Application No. 60/850,511 filed Oct. 10, 2006, U.S. Provisional Application No. 60/908,526 filed Mar. 28, 2007, U.S. Provisional Application No. 60/908,536 filed Mar. 28, 2007, U.S. Provisional Application No. 60/908,542 filed Mar. 28, 2007, U.S. Provisional Application No. 60/908,545 filed Mar. 28, 2007, all incorporated by reference. In addition, this application claims the benefit of European Application No. 06121669.3 filed Oct. 3, 2006, European Application No. 06121665.1 filed Oct. 3, 2006, European Application No. 07104953.0 filed Mar. 27, 2007, European Application No. 07104947.2 filed Mar. 27, 2007, European Application No. 07104948.0 filed Mar. 27, 2007, and European Application No. 07104950.6 filed Mar. 27, 2007, which are all also incorporated by reference.

FIELD OF THE INVENTION

The present invention concerns a process for producing non-transparent microvoided self-supporting films.

BACKGROUND OF THE INVENTION

U.S. Pat. No. 3,755,499 discloses a synthetic sheet for writing purposes which consists essentially of a linear polyester selected from the group consisting of polyethylene terephthalate, polyethylene isophthalate, and copolymers of ethylene terephthalate and ethylene isophthalate, and a high polymer having a higher glass transition point than that of said linear polyester at a mixing ration of from 7 to 35% by weight of the latter with respect to the polymer mixture, which high polymer is selected from the group consisting of a polymethylmethacrylate, a copolymer of acrylonitrile an styrene, a copolymer of acrylonitrile, butadiene and styrene, said synthetic sheet having a very finely coarsened surface due to said high polymer which is uniformly dispersed in said linear polyester to constitute the nuclei for the irregular surface thereof. Both simultaneous and sequential stretching of these mixed polymer materials are disclosed usually at 85 to 95° C. with stretching ratios from 2 to 3.5 times the original length, the sheet being adjusted for writability and opacity in conformity with its eventual use. The object of the invention of U.S. Pat. No. 3,755,499 is stated to be the provision of a synthetic sheet for writing and similar other purposes having improved surface condition, opacity, and other requisite properties. U.S. Pat. No. 3,755,499 further discloses that the thermoplastic resin to be mixed may or may not have compatibility with the linear polyester, provided that it can be substantially uniformly mixed with and dispersed in the linear polyester at the time of forming, that the formed film, regardless of whether it is transparent or not, may produce a uniform mat surface upon being stretched and the film thus obtained is heat-shrinkable, acceptable in its writing properties, and possesses adequate opacity and that in order to further improve stability in the film size at a high temperature, it may be heat-treated at a temperature above the stretching temperature of the linear polyester and below the melting point of both mixing thermoplastic resin and the linear polyester. EXAMPLE 2 exemplifies the mixing of a copolymer of acrylonitrile and styrene having a glass transition temperature of 100 to 105° C. with polyethylene terephthalate in concentrations of 7 and 35% by weight and the forming of 150 μm thick film samples by melt-extrusion through a T-die. These film sheets were then stretched simultaneously by a biaxial stretching machine at a stretch ratio twice as large as the original length of the film in the longitudinal as well as transverse directions thereof at 85° C. and also stretched simultaneously biaxially three times longitudinally and three times transversely at 85° C. The resulting films were reported to have the following properties:

| | | | | |
|---|---|---|---|---|
| acrylonitrile-styrene copolymer (% by wt.) | 7 | 7 | 35 | 35 |
| Polyethylene terephthalate (% by wt.) | 93 | 93 | 65 | 65 |
| stretch ratio (L × W) times | 2 × 2 | 3 × 3 | 2 × 2 | 3 × 3 |
| thickness after stretching (μm) | 48 | 26 | 45 | 25 |
| rupture strength (kg/cm) | 880 | 1210 | 650 | 730 |
| elongation at Breaking Point (%) | 110 | 45 | 55 | 23 |
| light Transmission Factor (%) | 80.8 | 84.2 | 72.3 | 77.6 |
| haze value (%) | 92.5 | 90.6 | 94.3 | 96.6 |
| writability [pencil hardness] | ≦4H | ≦3H | ≦4H | ≦3H |

U.S. Pat. No. 3,755,499 fails to disclose the influence of addition of an inorganic opacifying pigment or of the imagewise heating on the opaque microvoided films disclosed therein.

EP-A 0 606 663 discloses a method of manufacturing an opaque polyester copolymer support for reflective photographic materials comprising an inorganic inert pigment, said polyester comprising units of ethylene terephthalate as the main repeating units, said method comprising the following steps in the order given: either supplying terephthalic acid and ethylene glycol to bis(β-hydroxy-ethyl)terephthalate or its oligomer so as to carry out the esterification step, or supplying dimethylterephthalate and ethylene glycol so as to carry out transesterification, polycondensing under conditions of increasingly reduced vacuum, either granulating the obtained polymer, followed by drying the granules and feeding them to an extruder, or directly feeding the obtained copolymer in melt-form to an extruder, extruding the polymer in the form of a sheet, quenching and solidifying the resulting sheet on a quenching member, biaxially stretching the sheet, annealing the biaxially stretched film, characterised in that terephthalic acid or dimethyl-terephthalate respectively is replaced by another aromatic dicarboxylic acid or by the dimethylester of another aromatic dicarboxylic acid respectively, and/or ethylene glycol is replaced by another diol, said replacement(s) amounting to maximum 20 mol percent with respect to ethylene glycol and terephthalic acid or dimethylterephthalate respectively. EP-A 0 606 663 discloses as a preferred embodiment that the polyester copolymer is the polycondensation reaction product of ethylene glycol and either terephthalic acid, replaced for an amount up to a maximum of 20 mol % by isophthalic acid or dimethylterephthalate, replaced for an amount up to a maximum of 20 mol % by dimethyl isophthalate.

EP-A 0 654 503 discloses a shaped article prepared from a polymer blend of 50 to 97 wt. % of a linear polyester and 3 to 50 wt. % of a polymer containing styrene, wherein the percentages relate to the sum of the polyester and the polymer containing styrene. EP-A 0 654 503 also discloses that the polyester contains at least 80 wt. % polyethylene terephthalate and may contain up to 20 wt. % polyethylene isophthalate and exemplifies in EXAMPLE 7 a mixture of 85% by weight of polyester and 15% by weight of ABS 2, the polyester consisting of a mixture of 94% by weight of polyethylene terephthalate and 6% by weight of polyethylene isophthalate.

EP-A 1 291 155 discloses an embossable, coated polyethylene-terephthalate (PET) film comprising: a uniaxially oriented PET base film; and a coating applied to the PET base film, wherein the coating and the PET base film have as a composite been transversely stretched, said coating resin impregnating a surface portion of the PET base film upon said transverse stretching, thereby rendering the surface portion of the film susceptible to embossing. EP-A 1 291 155 also discloses that the PET base film is coextruded and forms at least two layers and a co-extruded co-polyester layer is described for EXAMPLES 4 and 5 consisting of an isophthalic acid co-terephthalic acid random co-polyester co-polymer with a mole ratio of about 18% isophthalic acid and 82% terephthalic acid.

The prior art non-transparent microvoided axially stretched film has suffered from insufficient opacity together with a lack of dimensional stability or sufficient dimensional stability and insufficient opacity. Moreover, for particular applications the whiteness of the non-transparent microvoided axially stretched film was insufficient.

ASPECTS OF THE INVENTION

It is therefore an aspect of the present invention to provide an improved non-transparent microvoided axially stretched film.

It is therefore a further aspect of the present invention to provide a process for producing an improved non-transparent microvoided axially stretched film.

It is therefore also an aspect of the present invention to provide a process for obtaining a transparent pattern in a non-transparent microvoided axially stretched film.

Further aspects and advantages of the invention will become apparent from the description hereinafter.

SUMMARY OF THE INVENTION

It has been found that a white, microvoided, non-transparent, self-supporting and biaxially stretched film with a continuous phase linear polyester matrix consisting essentially of monomer units of terephthalate, isophthalate and aliphatic dimethylene and having uniformly dispersed therein at least one amorphous high polymer with a higher glass transition temperature than the glass transition temperature of said linear polyester matrix and/or at least one crystalline high polymer having a higher melting point than the glass transition temperature of said linear polyester matrix can be surprisingly produced with higher optical densities, i.e. higher degrees of opacity, by using a linear polymer matrix in which the molar ratio of isophthalate monomer units to terephthalate monomer units in the linear polyester matrix is at least 0.02 and longitudinally stretching the extrudate at a stretching force>4 N/mm$^2$.

Aspects of the present invention are realized by a process for producing a non-transparent microvoided self-supporting film comprising the steps of: i) mixing at least one linear polyester having together monomer units consisting essentially of terephthalate, isophthalate and aliphatic dimethylene with the molar ratio of isophthalate monomer units to terephthalate monomer units being at least 0.02 to provide a linear polyester matrix; at least one amorphous high polymer with a higher glass transition temperature than the glass transition temperature of said linear polyester matrix and/or at least one crystalline high polymer having a higher melting point than the glass transition temperature of said linear polyester matrix; and optionally at least one ingredient from the group of ingredients consisting of inorganic opacifying pigments, whitening agents, UV-absorbers, light stabilizers, antioxidants, flame retardants and colorants in a kneader or an extruder; ii) forming the mixture produced in step i) in a thick film followed by quenching; iii) longitudinally stretching the thick film at a stretching force of >4 N/mm$^2$ to at least twice the initial length; and iv) transversely stretching the longitudinally stretched film from step (iii) to at least twice the initial width.

Aspects of the present invention have also been realized by a process for obtaining a transparent pattern comprising the step of: image-wise application of heat optionally supplemented by the application of pressure to a non-transparent microvoided biaxially stretched self-supporting film produced by a process comprising the steps of: i) mixing at least one linear polyester having together monomer units consisting essentially of terephthalate, isophthalate and aliphatic dimethylene with the molar ratio of isophthalate monomer units to terephthalate monomer units being at least 0.02 to provide a linear polyester matrix; at least one amorphous high polymer with a higher glass transition temperature than the glass transition temperature of said linear polyester matrix and/or at least one crystalline high polymer having a higher melting point than the glass transition temperature of said linear polyester matrix; and optionally at least one ingredient from the group of ingredients consisting of inorganic opacifying pigments, whitening agents, UV-absorbers, light stabilizers, antioxidants, flame retardants and colorants in a kneader or an extruder; ii) forming the mixture produced in step i) in a thick film followed by quenching; iii) longitudinally stretching the thick film at a stretching force of >4 N/mm$^2$ to at least twice the initial length; and iv) transversely stretching the longitudinally stretched film from step (iii) to at least twice the initial width.

Aspects of the present invention are also realized by the use of the non-transparent microvoided self-supporting film produced by the above-described process as a synthetic paper.

Aspects of the present invention are also realized by the use of the non-transparent microvoided self-supporting film produced by the above-described process in image recording elements.

Preferred embodiments of the present invention are disclosed in the detailed description of the invention.

DETAILED DESCRIPTION OF THE INVENTION

Definitions

The term voids or microvoids, as used in disclosing the present invention, means microcells, minute closed cells, cavities, bubbles or pores or cellulation, which, for example, can be formed in an oriented polymeric film during stretching as the result of a void-initiating particle initiated by particles that are immiscible with the polyester matrix. The voids or microvoids can be unfilled or filled with air or a vapour of some sort. Even if initially unfilled the voids or microvoids may over time become filled with air or a vapour of some sort.

The term "opaque", means a percentage opacity to visible light of greater than 90% as determined according to ASTM D589-97 or according to opacity test T425m-60 as published by TAPPI, 360 Lexington Avenue, N.Y., USA.

The term film, as used in disclosing the present invention, is an extruded sheet of a particular composition or a sheet consisting of a multiplicity of films with the same or different compositions produced by co-extrusion of liquids with the same or different compositions in contact with one another. The terms film and foil are used interchangeably in the present disclosure.

The term linear polyester, as used in disclosing the present invention, means a polyester comprising hydrocarbon dimethylene and dicarboxylate monomer units.

The term foam, as used in disclosing the present invention, means a substance that is formed by trapping many gas bubbles in a liquid or solid.

The term dimethylene aliphatic monomer unit in a linear polyester, as used in disclosing the present invention, means a monomer unit derived from a dimethylene aliphatic diol or an ether thereof, wherein the term aliphatic includes alicylic.

The term density, as used in disclosing the present invention, means the weight of a 100 mm×100 mm piece of film with a thickness measured in contact with an inductive probe with ball tip 3 mm in diameter divided by its volume. This value assumes that the surfaces of the piece of film are flat and parallel to one another. This value corresponds to the apparent density values reported in EP-A 0 496 323 and WO 2005/105903A.

The term inorganic opacifying pigment, as used in disclosing the present application, means a pigment capable of opacifying (i.e. rendering more opaque) which includes substantially white inorganic pigments having a refractive index of at least 1.4 and pigments, which as a dispersion in a polymer are capable upon stretching of causing opacity due to microvoiding.

The term whitening agent, as used in disclosing the present invention, means a white/colourless organic compound which exhibits a blue luminescence under the influence of ambient UV-light.

The term "support", as used in disclosing the present invention, means a "self-supporting material" so as to distinguish it from a "layer" which may be coated as a solution or dispersion, evaporated or sputtered on a support, but which itself is not self-supporting. It also includes an optional conductive surface layer and any treatment necessary for, or layer applied to aid, adhesion.

The term "chain-polymerized block", as used in disclosing the present invention, excludes condensation polymers and means a chain-polymerized polymer chain which may a block in a block copolymer or graft copolymer or may just be a chain-polymerized polymer chain.

The term overprintable, as used in disclosing the present invention, means capable of being overprinted by conventional impact and/or non-impact printing processes.

The term conventional printing processes, as used in disclosing the present invention, includes but is not restricted to ink-jet printing, intaglio printing, screen printing, flexographic printing, offset printing, stamp printing, gravure printing, dye transfer printing, thermal sublimation printing and thermal and laser-induced processes.

The term pattern, as used in disclosing the present invention, means a non-continuous layer which can be in any form of lines, squares, circles or any random configuration.

The term layer, as used in disclosing the present invention, means a (continuous) coating covering the whole area of the entity referred to e.g. a support.

The term "non-transparent film", as used in disclosing the present invention, means a film capable of providing sufficient contrast to a transparent image to make the image clearly perceptible. A non-transparent film can be an "opaque film", but need not necessarily be completely opaque in that there is no residual translucence i.e. no light penetration through the film. Optical density in transmission as measured with a MacBeth TR924 densitometer through a visible filter can provide a measure of the non-transparency of a film. ISO 2471 concerns the opacity of paper backing and is applicable when that property of a paper is involved that governs the extent to which one sheet visually obscures printed matter on underlying sheets of similar paper and defines opacity as "the ratio, expressed as a percentage, of the luminous reflectance factor of a single sheet of the paper with a black backing to the intrinsic luminous reflectance factor of the same sample with a white reflecting backing. 80 g/m$^2$ copy paper, for example, is white, non-transparent and has an optical density of 0.5 as measured with a MacBeth TR924 densitometer through a yellow filter according to ISO 5-2 and metallized films typically have an optical density ranging from 2.0 to 3.0.

The term transparent, as used in disclosing the present invention, means having the property of transmitting at least 50% of the incident visible light without diffusing it and preferably at least 70% of the incident visible light without diffusing it.

The term flexible, as used in disclosing the present invention, means capable of following the curvature of a curved object such as a drum e.g. without being damaged.

The term "colorant", as used in disclosing the present invention, means dyes and pigments.

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as an inorganic or organic, chromatic or achromatic colouring agent that is practically insoluble in the dispersion medium under the pertaining ambient conditions, hence having a solubility of less than 10 mg/L therein.

Process for Producing a Non-Transparent Microvoided Film

Aspects of the present invention are realized by a process for producing a non-transparent microvoided self-supporting film comprising the steps of: i) mixing at least one linear polyester having together monomer units consisting essentially of terephthalate, isophthalate and aliphatic dimethylene with the molar ratio of isophthalate monomer units to terephthalate monomer units being at least 0.02 to provide a linear polyester matrix; at least one amorphous high polymer with a higher glass transition temperature than the glass transition temperature of said linear polyester matrix and/or at least one crystalline high polymer having a higher melting point than the glass transition temperature of said linear polyester matrix; and optionally at least one ingredient from the group of ingredients consisting of inorganic opacifying pigments, whitening agents, UV-absorbers, light stabilizers, antioxidants, flame retardants and colorants in a kneader or an extruder; ii) forming the mixture produced in step i) in a thick film followed by quenching; iii) longitudinally stretching the thick film at a stretching force of >4 N/mm$^2$ to at least twice the initial length; and iv) transversely stretching the longitudinally stretched film from step (iii) to at least twice the initial width.

According to a first embodiment of the process, according to the present invention, the concentration of the uniformly dispersed at least one amorphous high polymer and/or the at least one crystalline high polymer in the polymer film is 5 to 35% by weight, preferably 9 to 25% by weight.

According to a second embodiment of the process, according to the present invention, the weight ratio of the linear polyester to the at least one amorphous polymer and/or the at least one crystalline high polymer dispersed therein is in the range of 1.85:1 to 19.0:1, with a range of 2.7:1 to 13:1 being preferred, 3.0:1 to 10:1 being particularly preferred.

According to a third embodiment of the process, according to the present invention, the amorphous high polymer particles or crystalline high polymer particles dispersed in the continuous phase have a diameter of less than 10 μm, with particles having a number average particle size of 0.5 to 5 μm being preferred and particles with an average particle size of 1 to 2 μm being particularly preferred. The smaller the particle size, the higher the opacity.

According to a fourth embodiment of the process, according to the present invention, the film is exclusive of a polyether such as polyethylene oxide. Such polyethers decrease the density and may decompose producing additional non-uniformly distributed voids.

According to a fifth embodiment of the process, according to the present invention, the film is provided with at least one of alphanumeric characters, an embossed pattern, an optionally embossed hologram and a continuous, half-tone or digital image.

According to a sixth embodiment of the process, according to the present invention, the film is provided on at least one side with a transparent overprintable layer i.e. suitable for impact or non-impact printing. This transparent overprintable layer can be provided over at least one of alphanumeric characters, an embossed pattern, an optionally embossed hologram and a continuous, half-tone or digital image on a surface of the non-transparent microvoided axially stretched self-supporting film.

According to a seventh embodiment of the process, according to the present invention, the film is provided on at least one side with a transparentizable porous overprintable layer i.e. suitable for impact or non-impact printing e.g. ink-jet printing. Transparentizable porous layers transparentized by the application of a liquid with an appropriate refractive index, which can also be applied image-wise, are as disclosed in EP-A 1 362 710 and EP-A 1 398 175. This transparentizable overprintable layer can be provided over at least one of alphanumeric characters, an embossed pattern, an optionally embossed hologram and a continuous, half-tone or digital image on a surface of the non-transparent microvoided axially stretched self-supporting film with a transparent pattern.

Transparentization of part of the transparentizable porous receiving layer can itself produce an image or the non-transparentized area of the opaque porous receiving layer can itself represent an image. The transparent pattern can, for example, be part of a banknote, a share certificate, a ticket, a credit card, an identity document or a label for luggage and packages.

According to an eighth embodiment of the process, according to the present invention, the polymeric film has a thickness in the range from about 10 μm to about 500 μm, with from about 50 μm to about 300 μm being preferred.

According to a ninth embodiment of the process, according to the present invention, the polymeric film is provided with a subbing layer. This subbing layer makes it possible to improve wettability and adhesive property of the polymeric film and preferably comprises a polyester resin, a polyurethane resin, a poly(ester urethane) resin or an acrylic resin.

The quenched extruded thick film has a thickness of approximately 10 to approximately 6000 μm, with a thickness of approximately 100 μm to 5000 μm being preferred.

The biaxially stretched polymeric film, according to the present invention, is realized by first stretching in one direction (e.g. in the machine direction=MD) and then stretching in a second direction [e.g. perpendicularly to the machine direction=TD (transversal direction)]. This orients the polymer chains thereby increasing the density and crystallinity.

Longitudinal orientation in the direction of extrusion can be carried out with the aid of two rolls running at different speeds corresponding to the desired stretching ratio by setting the surface speed V2 of the rotating rollers relative to the linear extrusion speed V1 so that the stretch ratio is V2/V1. The longitudinal stretching ratio should be sufficient to create voids.

The longitudinal stretching operations known in the art to produce axially and biaxially oriented polyester film may be used. For instance, the combined film layers are passed between a pair of infra red heaters which heats the layers to a temperature above the glass transition temperature of the polyester (about 80° C. for polyethylene terephthalate and about 60° C. for polyethylene isophthalate) in the region where the stretching occurs. The temperature above should be close to the glass transition temperature of the continuous phase polymer in order to improve opacity. In the case of polyethylene terephthalate, the longitudinal stretching is generally carried out at from about 80 to about 140° C. During longitudinal stretching opacity is realized as a result of the voids produced in the film extending longitudinally from each particle of dispersed polymer.

Transverse stretching is carried out at an angle substantially 90° to the direction of longitudinal stretching, with the angle being typically between about 70° and 90°. For transverse orientation use is generally made of an appropriate tenter frame, clamping both edges of the film and then drawing toward the two sides by heating the combined layers with the primer layer(s) thereon by, for example, passing through hot air heaters which heat the film above the glass transition temperature. In the case of polyethylene terephthalate and its copolymers, the transverse stretching is carried out at from about 80 to about 170° C., with from about 85 to about 150° being preferred. The transverse stretching of the film causes the voids to extend transversely.

The production of the biaxially stretched polymeric film, according to the present invention, is produced by longitudinally stretching the thick film to at least twice the initial length at a stretching tension>4.0 N/mm$^2$ and after intermediate quenching the longitudinal stretching is followed by transverse stretching at an angle substantially 90° to the first stretching process to at least thrice the initial width at a stretching tension of preferably >4.0 N/mm$^2$ preferably at a temperature at or below 30° C. above the glass transition temperature of the continuous phase and particularly preferably at or below 20° C. above the glass transition temperature of the continuous phase.

According to a tenth embodiment of the process, according to the present invention, the longitudinal stretching force is >5 N/mm$^2$, with a longitudinal stretching force>6.0 N/mm$^2$ being preferred and a longitudinal stretching force>7.0 N/mm$^2$ being particularly preferred.

According to an eleventh embodiment of the process, according to the present invention, the transverse stretching is performed with a force>4.0 N/mm$^2$, with a transversal stretching force>5 N/mm$^2$ being preferred and a transversal stretching force>6.0 N/mm$^2$ being particularly preferred and a transversal stretching force>7.0 N/mm$^2$ being especially preferred.

According to a twelfth embodiment of the process, according to the present invention, the longitudinal stretching temperature is not more than 40° C. above the glass transition temperature of the linear polyester matrix, with a longitudinal stretching temperature of not more that 30° C. above the glass transition temperature of the linear polyester matrix being preferred and a longitudinal stretching temperature of not more that 20° C. above the glass transition temperature of the linear polyester matrix being especially preferred.

According to a thirteenth embodiment of the process, according to the present invention, the transverse stretching temperature is not more than 40° C. above the glass transition temperature of the linear polyester matrix, with a transverse stretching temperature of not more that 30° C. above the glass transition temperature of the linear polyester matrix being preferred and a transverse stretching temperature of not more that 20° C. above the glass transition temperature of the linear polyester matrix being especially preferred.

Longitudinal and transverse stretching may be performed simultaneously e.g. with an apparatus produced by Brückner.

The stretching ratio for longitudinal stretching is preferably between about 2 and about 6, with between about 2.5 and about 5 being preferred and between 3 and 4 being particularly preferred. The higher the stretching ratio, the higher the opacity.

According to a fourteenth embodiment of the process, according to the present invention, the longitudinal stretching ratio is at least 2.5, with at least 3.0 being preferred.

Transverse stretching ratio is preferably in the range of from about 2 to about 6, with a range of 2.5 to about 5 being preferred and a range of from about 3 to about 4 being particularly preferred. The opacity increases at higher stretching rates in %/min and also at lower transverse stretching temperatures.

According to a fifteenth embodiment of the process, according to the present invention, the transversal stretching ratio is at least 2.5, with at least 3.0 being preferred.

The production process may further comprise, as a further step, a thermal fixation step to counter shrinkage. For example the biaxially stretched film is passed through a second set of hot air heaters which blow hot air at a temperature of between 140 and 240° C. onto the film layers to heat-set or thermofix the film layers. The heat-set temperature must be sufficient to obtain crystallization of the polyester but care must be taken not to overheat the layers since the voids can collapse. On the other hand increasing the heat-set temperature improves the dimensional stability of the film. An appropriate mix of properties can be obtained by varying the heat-set temperature. The preferred heat-set or thermofixation temperature in the case of polyethylene terephthalate or polyethylene naphthalate is at or above 140° C.

Before or after longitudinal stretching a first subbing layer, called a primer layer, may be applied to the non-voided polyester layer by a coating means such as an air knife coating system. The first subbing layer is for example formed from a (meth)acrylate copolymer, a poly(meth)acrylate, a polyurethane, a sulphonated polyester, a styrene-(meth)acrylate copolymer or a chloride containing copolymer such as vinylidene chloride copolymer in latex form having some hydrophilic functionality through the presence of a copolymerized unsaturated carboxylic acid which is applied as an aqueous dispersion.

According to a sixteenth embodiment of the process, according to the present invention, the film is exclusive of foam.

According to a seventeenth embodiment of the process, according to the present invention, the film is exclusive of foaming agent and/or decomposition products of a foaming agent.

Optical Density of the Film Due to Microvoids

The optical density of the film measured in transmission with a visible filter due to microvoids is obtained by measuring the optical density of the film without void-producing ingredients as a function of film thickness to provide comparative values. The optical density of a film measured in transmission with a visible filter due to voids is then obtained by biaxially stretching a composition to which has been added the void-inducing ingredient and subtracting the measured optical density measured in transmission with a visible filter from the optical density measured in transmission with a visible filter for the film composition without void-inducing ingredient for the film thickness expected on the basis of the longitudinal and transverse drawing ratios.

Linear Polyester

According to an eighteenth embodiment of the process, according to the present invention, the molar ratio of isophthalate monomer units to terephthalate monomer units is at least 0.04, with a molar ratio of at least 0.05 being preferred, a molar ratio of at least 0.065 being particularly preferred and a molar ratio of at least 0.075 being especially preferred.

According to a nineteenth embodiment of the process, according to the present invention, the molar ratio of isophthalate monomer units to terephthalate monomer units is at least 0.11, with a molar ratio of at least 0.13 being preferred and a molar ratio of at least 0.15 being particularly preferred.

According to a twentieth embodiment of the process, according to the present invention, the molar ratio of isophthalate monomer units to terephthalate monomer units is at least 0.17, with a molar ratio of at least 0.20 being preferred and a molar ratio of at least 0.25 being particularly preferred.

According to a twenty-first embodiment of the process, according to the present invention, the molar ratio of isophthalate monomer units to terephthalate monomer units is 0.50 or less, with a molar ratio of 0.45 or less being preferred and a molar ratio of 0.30 or less being particularly preferred.

According to a twenty-second embodiment of the process, according to the present invention, the number average molecular weight of the linear polyester is 10,000 to 30,000.

Examples of suitable aliphatic dimethylenes include ethylene, propylene, methylpropylene, tetramethylene, pentamethylene, hexamethylene, neopentylene [—$CH_2C(CH_3)_2$—$CH_2$], 1,4-cyclohexane-dimethylene, 1,3-cyclohexane-dimethylene, 1,3-cyclopentane-dimethylene, norbornane-dimethylene, —$CH_2CH_2(OCH_2CH_2)_n$—, where n is an integer with 1 to 5 being preferred, and mixtures thereof.

According to a twenty-third embodiment of the process, according to the present invention, the aliphatic dimethylene monomer units are selected from the group consisting of ethylene, tetramethylene, neopentylene, norbornane-dimethylene and 1,4-cyclohexane-dimethylene.

According to a twenty-fourth embodiment of the process, according to the present invention, the aliphatic monomer units consist of ethylene units and neopentylene and/or 1,4-cyclohexanedimethylene units and the molar ratio of neopentylene and/or 1,4-cyclohexanedimethylene monomer units to ethylene monomer units is at least 0.02, with a molar ratio of at least 0.04 being preferred and a molar ratio of 0.065 being particularly preferred.

According to a twenty-fifth embodiment of the process, according to the present invention, the linear polyester comprises at least two linear polyester resins. Upon heating, e.g. during mixing in an extruder, the different linear aromatic polyester resins present will undergo metathesis, condensing and decondensing so as to evolve upon sufficiently long heating into a single resin.

Such polyesters are well known in the art and may be produced by well-known techniques, for example, those described in U.S. Pat. No. 2,465,319 and U.S. Pat. No. 2,901,466.

According to a twenty-sixth embodiment of the polymeric film, according to the present invention, the polymeric film further contains an electroconductivity enhancing additive e.g. a metallic salt which ionizes in the melt giving enhanced electroconductivity such as magnesium acetate, manganese salts and cobalt sulphate. Suitable salt concentrations are about $3.5 \times 10^{-4}$ moles/mole polyester. Enhanced polyester melt viscosity enables improved pinning of the melt on the chilling roller maintained at a temperature of 5 to 25° C. (preferably 15 to 30° C.) to cool the extrudate thereby enabling higher stretching forces to be realized and hence enhanced void-forming and a higher degree of opacification.

The linear polyester utilized in the present invention should have a glass transition temperature from 40° C. to 150° C., preferably from 50 to 120° C. and should be orientable.

According to a twenty-seventh embodiment of the process, according to the present invention, the linear polyester has an inherent viscosity determined in a 0.5 g/dL solution of 60 wt % phenol and 40 wt % ortho-dichlorobenzene at 25° C. of at least 0.45 dl/g with an inherent viscosity of 0.48 to 0.9 dl/g being preferred and an inherent viscosity of 0.5 to 0.8 dl/g being particularly preferred.

Amorphous High Polymer

The amorphous high polymer used in the polymeric film, used in the present invention, has a glass transition temperature higher than the glass transition temperature of the continuous phase in which it is dispersed e.g. a linear polyester. Poly(ethylene terephthalate), for example, has a glass transition temperature of ca. 80° C.

The glass transition temperatures and refractive indices for various amorphous high polymers are given in the table below:

| | $T_g$ [° C.] | Refractive index for sodium line at 589.3 nm [ASTM D642] |
|---|---|---|
| polystyrene | 100 | 1.57-1.60 |
| poly-α-methyl-styrene | 168 | 1.610 |
| poly-4-methyl-styrene | 93 | — |
| poly-α-vinyl-naphthalene | 159 | 1.6818 |
| polyacrylonitrile | 85 | 1.514, 1.5187 |
| polymethacrylonitrile | 120 | 1.520 |
| polymethyl methacrylate | 105 | 1.49, 1.4893 |
| polyacrylamide | 165 | — |
| copolymer of acrylonitrile and styrene | 112 | 1.56-1.57, 1.57 |
| copolymer of 28.5 wt % acrylonitrile and 71.5 wt % styrene | 108 | 1.56-1.57, 1.57 |
| ABS | 110 | 1.53-1.54 |

According to a twenty-eighth embodiment of the process, according to the present invention, the uniformly dispersed amorphous high polymer is crosslinked or non-crosslinked.

According to a twenty-ninth embodiment of the process, according to the present invention, the amorphous high polymer comprises at least one chain-polymerized block.

According to a thirtieth embodiment of the process, according to the present invention, the amorphous high polymer comprises at least one chain-polymerized block and the at least one chain-polymerized block is selected from the group consisting of polystyrene, styrene copolymers, SAN-polymers, polyacrylates, acrylate-copolymers, polymethacrylates and methacrylate-copolymers.

According to a thirty-first embodiment of the process, according to the present invention, the amorphous high polymer comprises at least one chain-polymerized styrene copolymer block selected from the group consisting of SAN-polymers, ABS-polymers and SBS-polymers.

According to a thirty-second embodiment of the process, according to the present invention, the amorphous high polymer comprises at least one chain-polymerized SAN-polymer block, wherein the concentration of AN-monomer units in the SAN-polymer is 15 to 35% by weight.

According to a thirty-third embodiment of the process, according to the present invention, the amorphous high polymer is exclusive of a cellulose ester.

According to a thirty-fourth embodiment of the process, according to the present invention, the amorphous high polymer is at least partially crosslinked e.g. at least partially crosslinked poly(methyl methacrylate) or at least partially crosslinked copolymers of acrylonitrile and styrene.

According to a thirty-fifth embodiment of the process, according to the present invention, the film has a linear polyester as continuous phase and dispersed therein is a high polymer having a degree of crosslinking of at least 10%.

According to a thirty-sixth embodiment of the process, according to the present invention, the amorphous high polymer is a SAN polymer, the SAN polymer concentration being preferably at least 5% by weight of the film, with at least 10% by weight of the film being particularly preferred.

The SAN polymer additive of the present composition is a known class of polymer consisting essentially of a random copolymer of a styrenic monomer component, including styrene as well as an alpha-lower alkyl-substituted styrene or mixtures thereof and an acrylonitrilic monomer component including acrylonitrile as well as an alpha-lower alkyl substituted acrylonitrile or mixtures thereof. By lower-alkyl is meant a straight or branched chain alkyl group of 1 to 4 carbon atoms exemplified by the methyl, ethyl, isopropyl and t-butyl groups. In readily available SAN polymers, the styrene component is generally styrene, alpha-straight chain alkyl substituted styrene, typically alpha-methyl-styrene, or mixtures thereof with styrene being preferred. Similarly in the readily available SAN polymers, the acrylonitrile component is generally acrylonitrile, alpha-methyl-acrylonitrile or mixtures thereof with acrylonitrile being preferred.

In the SAN polymer the styrene component is present in a major weight proportion, i.e. in a weight proportion of greater than 50%, typically about 65% to about 90%, especially about 70% to about 80%, based on the combined weight of the styrene component and the acrylonitrile component. The acrylonitrile component is present in a minor proportion, i.e. in a weight proportion of less than 50%, typically about 10% to about 35% especially about 20% to 30% based on the combined weight of the styrene monomer component and the acrylonitrile monomer component. Styrene-acrylonitrile copolymers are currently commercially available with an acrylonitrile content of 15 to 35% by weight, with 18 to 32% by weight being preferred and 21 to 30% by weight being particularly preferred.

The SAN polymer class is more particularly identified and described in R. E. Gallagher, U.S. Pat. No. 3,988,393, issued Oct. 26, 1976 (especially at Column 9, lines 14-16 and in Claim 8), in "Whittington's Dictionary of Plastics", Technomic Publishing Co., First Edition, 1968, page 231, under the section headed "Styrene-Acrylonitrile Copolymers (SAN)", and R. B. Seymour, "Introduction to Polymer Chemistry", McGraw-Hill, Inc., 1971, page 200, (last two lines) to page 201 (first line). The preparation of a SAN polymer by copolymerization of styrene and acrylonitrile is more particularly described in the "Encyclopedia of Polymer Science and Technology", John Wiley and Sons, Inc., Vol. 1, 1964, pages 425-435.

According to a thirty-seventh embodiment of the process, according to the present invention, the amorphous high polymer is a non-crosslinked SAN polymer having a number average molecular weight in the range of 30,000 to 100,000, preferably in the range of 40,000 to 80,000. Typical SAN-polymers have number averaged molecular weights of 45,000 to 60,000 and polymer dispersities ($M_w/M_n$) of 1.2 to 2.5.

According to a thirty-eighth embodiment of the process, according to the present invention, the amorphous high polymer is a non-crosslinked SAN polymer having a weight average molecular weight in the range of 50,000 to 200,000, preferably in the range of 75,000 to 150,000. The higher the molecular weight of the SAN polymer, the larger the size of the dispersed SAN polymer particles.

Crystalline High Polymer

The crystalline high polymer used in the polymeric film, according to the present invention, has a melting point higher than the glass transition temperature of the continuous phase polymer in which it is dispersed e.g. a linear polyester. Crystalline high polymers with sufficiently high melting points include polyethylene, polypropylene and poly(4-methyl-1-pentene).

According to a thirty-ninth embodiment of the process, according to the present invention, the film has a linear polyester as continuous phase and dispersed therein are crystalline high polymer particles having a number averaged particle size of 0.5 to 5 μm, with 1 to 2 μm being preferred.

The melting points and refractive indices for various polyethylenes and polypropylenes are given in the table below:

| | $T_m$ [° C.] | Refractive index for sodium line at 589.3 nm [ASTM D642] |
|---|---|---|
| polyethylene | 95 | 1.51-1.54 |
| high density polyethylene | 141 | 1.51-1.54 |
| isotactic polypropylene | 165 | 1.49 |
| syndiotactic polypropylene | 189 | 1.49 |
| polypropylene (atactic) | | 1.4735 |
| Poly (4-methyl-pentene) | 235 | 1.4630 |

Inorganic Opacifying Pigment

According to a fortieth embodiment of the process, according to the present invention, the film further comprises at least one inorganic opacifying pigment selected from the group consisting of: silica, zinc oxide, zinc sulphide, lithopone, barium sulphate, calcium carbonate, titanium dioxide, aluminium phosphate and clays. The titanium dioxide may have an anatase or rutile morphology and may be stabilized by alumina oxide and/or silicon dioxide. The aluminium phosphate can be an amorphous hollow pigment e.g. the Biphor™ pigments from BUNGE.

The refractive indices of these pigments is given in the table below:

| inorganic opacifying pigment | refractive index for sodium line at 589.3 nm |
|---|---|
| kaolinite | 1.53-1.57 |
| bentonite | 1.557 |
| china clay | 1.56 |
| silica - silica gel | 1.55 |
| silica - cristobalite | 1.487, 1.484 |
| silica - quartz | 1.544, 1.553 |
| calcium carbonate | 1.59, 1.6, 1.58 |
| calcium carbonate - calcite | 1.486, 1.64-1.66 |
| barium sulphate - baryte | 1.637, 1.638, 1.649, 1.64 |
| Lithopone 30% (zinc sulphide/barium sulphate) | 1.84 |
| zinc oxide (ultrafine) | 1.9 |
| zinc oxide (zincite) | 2.008, 2.029 |
| zinc sulphide | 2.37 |
| titanium dioxide - anatase | 2.554, 2.493, 2.55 |
| titanium dioxide - rutile | 2.616, 2.903, 2.76 |

According to a forty-first embodiment of the process, the film comprises ≦5° by weight of inorganic opacifying pigment i.e. the total quantity of inorganic opacifying pigment present regardless of type is ≦5% by weight, with ≦3% by weight of inorganic opacifying pigment being preferred.

According to a forty-second embodiment of the process, according to the present invention, the film further comprises an inorganic opacifying pigment having a number averaged particle size between 0.1 and 10 μm, with 0.2 to 2 μm being preferred.

Addition of an inorganic opacifying pigment has the advantage of stabilizing the orientation of the polyester, so that the non-transparent microvoided axially stretched self-supporting film can be stabilized at temperatures of 175° C. without substantially affecting the opacity of the non-transparent microvoided axially stretched self-supporting film. Without the presence of an inorganic opacifying pigment, such as $BaSO_4$ or $TiO_2$, thermofixing of the polyester is possible, but only at the expense of some of the opacity of the non-transparent microvoided axially stretched self-supporting film. Moreover, pigments with a refractive index below 2.0 do not of themselves provide substantial opacity due to the small refractive index differences between the pigment and the polymer matrix.

Titanium dioxide particles dispersed in polymer films have been found not to induce microvoiding upon stretching the films.

Whitening Agent

According to a forty-third embodiment of the process, according to the present invention, the concentration of whitening agent is ≦0.5% by weight, with ≦0.1% by weight being preferred, ≦0.05% by weight being particularly preferred, ≦0.035% by weight being especially preferred.

According to a forty-fourth embodiment of the process, according to the present invention, the film further comprises a whitening agent selected from the group consisting of bis-benzoxazoles e.g. bis-benzoxazolyl-stilbenes and bis-benzoxazolyl-thiophenes; benzotriazole-phenylcoumarins; naphthotriazole-phenylcoumarins; triazine-phenylcoumarins and bis(styryl)biphenyls.

Suitable whitening agents are:

| UVITEX ® OB | | CIBA |
|---|---|---|
| UVITEX ® OB-ONE | | CIBA |
| Eastobrite OB | 2,5-thiophenediylbis (5-tert-butyl-1,3-benzoxazole) | Eastman Chemical |
| | bis-benzoxazolyl-stilbene | |
| | bis-benzoxazolyl-thiophene | |

Flame Retardant

According to a forty-fifth embodiment of the process, according to the present invention, the film further comprises a flame retardant selected from the group consisting of: brominated compounds; organophosphorus compounds; melamine; melamine-derivatives, e.g. melamine salts with organic or inorganic acids such as boric acid, cyanuric acid, phosphoric acid or pyro/poly-phosphoric acid, and melamine homologues such as melam, melem and melon; metal hydroxides e.g. aluminium hydroxide and magnesium hydroxide; ammonium polyphosphates and zinc borate e.g. with a composition of $xZnO.yB_2O_3.zH_2O$ such as $2ZnO.3B_2O_3.3.5H_2O$.

Suitable flame retardants include:

| | | |
|---|---|---|
| SAYTEX ® HP-7010 P/G | brominated polystyrene | Albemarle Corporation |
| SAYTEX ® HP-3010 | brominated polystyrene | Albemarle Corporation |
| SAYTEX ® 8010 | ethane-1,2-bis(pentabromo-phenyl) | Albemarle Corporation |
| SAYTEX ® BT-93 | ethylene bis-tetrabromo-phthalimide | Albemarle Corporation |
| SAYTEX ® BT-93W | Ethylene bis-tetrabromo-phthalimide | Albemarle Corporation |
| SAYTEX ® CP-2000 | brominated compound | Albemarle Corporation |
| SAYTEX ® 120 | tetradecabromo-diphenoxy benzene | Albemarle Corporation |
| SAYTEX ® 102E | Decabromodiphenyl oxide | Albemarle Corporation |
| SAYTEX ® 9006L | brominated compound | Albemarle Corporation |
| SAYTEX ® HP-900 | brominated compound | Albemarle Corporation |
| SAYTEX ® HP-800A | brominated compound | Albemarle Corporation |
| SAYTEX ® HP-800AG | brominated compound | Albemarle Corporation |
| SAYTEX ® BC70HS | brominated compound | Albemarle Corporation |
| NcendX P-30 | organophosphorus compound | Albemarle Corporation |
| MARTINAL ® OL-104 | aluminium hydroxide | Albemarle Corporation |
| MARTINAL ® OL-104/LE | aluminium hydroxide | Albemarle Corporation |
| MARTINAL ® OL-104/WE | aluminium hydroxide | Albemarle Corporation |
| MARTINAL ® OL-104/LFF | aluminium hydroxide | Albemarle Corporation |
| MARTINAL ® OL-104/LCD | aluminium hydroxide | Albemarle Corporation |
| MARTINAL ® OL-107 | aluminium hydroxide | Albemarle Corporation |
| MARTINAL ® OL-107/LE | aluminium hydroxide | Albemarle Corporation |
| MARTINAL ® OL-107/LFF | aluminium hydroxide | Albemarle Corporation |
| MARTINAL ® OL-107/LCD | aluminium hydroxide | Albemarle Corporation |
| MARTINAL ® OL/Q-107 | aluminium hydroxide | Albemarle Corporation |
| MARTINAL ® OL-111/LE | aluminium hydroxide | Albemarle Corporation |
| MAGNIFIN ® H3 | magnesium hydroxide | Albemarle Corporation |
| MAGNIFIN ® H5 | magnesium hydroxide | Albemarle Corporation |
| MAGNIFIN ® H7 | magnesium hydroxide | Albemarle Corporation |
| MAGNIFIN ® H10 | magnesium hydroxide | Albemarle Corporation |
| MAGNIFIN ® T2C | magnesium hydroxide | Albemarle Corporation |
| MAGNIFIN ® T3C | magnesium hydroxide | Albemarle Corporation |
| MELAPUR ® MCXL | melamine cyanurate | CIBA |
| MELAPUR ® MC50 | melamine cyanurate | CIBA |
| MELAPUR ® MC25 | melamine cyanurate | CIBA |
| MELAPUR ® 200 70 | melamine polyphosphate | CIBA |
| MELAPUR ® MP | melamine phosphate | CIBA |
| FIREBRAKE ® ZB | a zinc borate compound | LUZENAC |
| FIREMASTER ® PBS-64 | brominated styrene-based technology | GREAT LAKES CHEMICAL CORP. |
| FIREMASTER ® PBS-64HW | brominated styrene-based technology | GREAT LAKES CHEMICAL CORP. |
| FIREMASTER ® CP-44B | copolymer of brominated styrene & glycidyl methacrylate | GREAT LAKES CHEMICAL CORP. |

Antioxidant

According to a forty-sixth embodiment of the process, according to the present invention, the film further comprises an antioxidant selected for the group consisting of organotin derivatives, sterically hindered phenols, sterically hindered phenol derivatives and phosphites.

Suitable flame retardants include:

| | | |
|---|---|---|
| ETHANOX ® 310 | Organotin catalyzed penta-erythritol tetrakis (3-(3,5-di-t-butyl-4-hydroxyphenyl)-propionate) | Albemarle Corporation |
| ETHANOX ® 310TF | "Tin-free" pentaerythritol tetrakis (3-(3,5-di-t-butyl-4-hydroxyphenyl)propionate) | Albemarle Corporation |
| ETHANOX ® 314 | 1,3,5-tris(3,5-di-tert-butyl-4-hydroxybenzyl)-1,3,5-tria-zine-2,4,6(1h,3h,5h)-trione | Albemarle Corporation |
| ETHANOX ® 330 | 1,3,5-trimethyl-2,4,6-tris(3,5-di-tert-butyl-4-hydroxy-benzyl)benzene | Albemarle Corporation |
| ETHANOX ® 376 | octadecyl-3-(3,5-di-t-butyl-4-hydroxyphenyl)-propionate | Albemarle Corporation |
| ETHAPHOS ™ 368 | tris-(2,4-di-t-butylphenyl)phosphite | Albemarle Corporation |
| ETHAPHOS ™ 326 | Bis(2,4-di-t-butylphenyl) pentaerythritol diphosphite | Albemarle Corporation |
| IRGANOX ® 259 | | CIBA |
| IRGANOX ® 1010 | | CIBA |
| IRGANOX ® 1425 | | CIBA |
| IRGANOX ® B 900 | | CIBA |

-continued

| | | |
|---|---|---|
| HOSTANOX ® O 3 | Bis[3,3'-bis-(4'-hydroxy-3'-tert-butyl-phenyl)butanoic acid]glycol ester | CLARIANT |
| HOSTANOX ® O 10 | tetrakis[methylene(3,5-di-t-butyl-4-hydroxy-benzyl)isocyanurate | CLARIANT |
| HOSTANOX ® O 310 | 1/1 mixture of HOSTANOX ® O 10 & HOSTANOX ® O 3 | CLARIANT |
| HOSTANOX ® 245 | ethylene bis(oxyethylene)bis-[3-(5-t-butyl-4-hydroxy-m-tolyl)-propionate] | CLARIANT |

Light Stabilizers

According to a forty-seventh embodiment of the process, according to the present invention, the film further comprises a hindered amine light stabilizer.

Suitable light stabilizers include:

| | | |
|---|---|---|
| LS-01 | CHIMASSORB 119 | CIBA |
| LS-02 | CHIMASSORB 944 | CIBA |
| LS-03 | TINUVIN ® 123 | CIBA |
| LS-04 | TINUVIN ® 144 | CIBA |
| LS-05 | TINUVIN ® 622 | CIBA |
| LS-06 | TINUVIN ® 765 | CIBA |
| LS-07 | TINUVIN ® 770 | CIBA |
| LS-08 | TINUVIN ® 783 | CIBA |
| LS-09 | TINUVIN ® 791 | CIBA |
| LS-10 | TINUVIN ® B 75 | CIBA |
| LS-11 | TINUVIN ® B 241 | CIBA |

UV-Absorbers

According to a forty-eighth embodiment of the process, according to the present invention, the film further comprises an UV-absorber selected from the group consisting of benzotriazole derivatives and triazine derivatives.

Suitable UV-absorbers include:

| | | | Manufacturer |
|---|---|---|---|
| UV-01 | CHIMASSORB | | CIBA |
| UV-02 | TINUVIN ® 213 | | CIBA |
| UV-03 | TINUVIN ® 234 | | CIBA |
| UV-04 | TINUVIN ® 327 | | CIBA |
| UV-05 | TINUVIN ® 360 | | CIBA |
| UV-06 | TINUVIN ® 1577 | | CIBA |
| UV-07 | HOSTAVIN ® PR-25 | propanedioic acid, [(4-methoxy-phenyl)-methylene]-, dimethyl ester | CLARIANT |
| UV-08 | SANDUVOR ® VSU | 2-ethyl-2'-ethoxy-oxalanilide | CLARIANT |
| UV-09 | HOSTAVIN ® B-CAP | tetra-ethyl-2,2'-(1,4-phenylene-dimethylidene)-bismalonate | CLARIANT |
| UV-10 | HOSTAVIN ® ARO 8 | 2-hydroxy-4-n-octyloxybenzophenone | CLARIANT |

Image Recording Element

Aspects of the present invention are also realized by the use of the non-transparent self-supporting film produced according to the present invention in image recording elements.

According to a first embodiment of the use of the non-transparent self-supporting film produced according to the present invention in image recording elements, according to the present invention, the film is provided on at least one side with a transparent overprintable layer i.e. for impact and non-impact printing.

According to a second embodiment of the use of the non-transparent self-supporting film produced according to the present invention in image recording elements, according to the present invention, the film is provided on at least one side with a non-transparent overprintable layer i.e. suitable for at least one impact and non-impact print technique.

According to a third embodiment of the use of the non-transparent self-supporting film produced according to the present invention in image recording elements, according to the present invention, according to the present invention, the film is provided on at least one side with a non-transparent transparentizable overprintable layer i.e. i.e. suitable for at least one impact and non-impact print technique.

According to a fourth embodiment of the use of the non-transparent self-supporting film produced according to the present invention in image recording elements, according to the present invention, the film is provided on at least one side with an ink-jet receiving layer. Typical receiving layers are either porous in the case of aqueous or solvent inks or pastes to enable rapid drying to the touch or are non-porous in the case of phase-change inks or curable inks e.g. radiation curable inks. Porous receiving layers typically comprise at least one pigment such as silica or alumina; at least one binder, such as an ammonium salt of a styrene-acrylate-acrylic acid terpolymer; a surfactant e.g. an anionic surfactant such as an aliphatic sulphonate; optionally a levelling agent, such as polydimethylsiloxane, and optionally a mordant.

According to a fifth embodiment of the use of the non-transparent self-supporting film produced according to the present invention in image recording elements, according to the present invention, the film is provided on at least one side with an imaging layer e.g. a photographic layer e.g. a silver halide emulsion layer; a photothermographic element and a substantially light-insensitive thermographic element; and the dye receiver layer of a dye thermal transfer system.

According to a sixth embodiment of the use of the non-transparent self-supporting film produced according to the present invention in image recording elements, according to the present invention, the film is provided on at least one side with a writable layer e.g. with a pencil, ball-point pen and fountain pen.

Process for Obtaining a Transparent Pattern

Aspects of the present invention have been realized by a process for obtaining a transparent pattern comprising the step of: image-wise application of heat optionally supplemented by the application of pressure to a non-transparent microvoided biaxially stretched self-supporting film produced by a process comprising the steps of: i) mixing at least one linear polyester having together monomer units consisting essentially of terephthalate, isophthalate and aliphatic dimethylene with the molar ratio of isophthalate monomer units to terephthalate monomer units being at least 0.02 to provide a linear polyester matrix; at least one amorphous high polymer with a higher glass transition temperature than the glass transition temperature of said linear polyester matrix and/or at least one crystalline high polymer having a higher melting point than the glass transition temperature of said linear polyester matrix; and optionally at least one ingredient from the group of ingredients consisting of inorganic opacifying pigments, whitening agents, UV-absorbers, light stabilizers, antioxidants, flame retardants and colorants in a kneader or an extruder; ii) forming the mixture produced in step i) in a thick film followed by quenching; iii) longitudinally stretching the thick film at a stretching force of >4 $N/mm^2$ to at least twice the initial length; and iv) transversely stretching the longitudinally stretched film from step (iii) to at least twice the initial length.

According to a first embodiment of the process for obtaining a transparent pattern, according to the present invention, the heat is applied by a heated or hot stamp, a thermal head, a heated or hot bar or a laser. The heating can be carried out from one or both sides of the film. Optical density changes of at least 0.4 can be readily realized or up to 40% without significant changes in film thickness. Moreover, the transparentization effect realized by the process for obtaining a transparent pattern, according to the present invention, results from a combination of heat supplied by a heat source, the pressure between the heat source and the film and the time the heat source is applied. The heat has to be applied for at least 1 ms either continuously or non-continuously. Heating with a thermal head can be with a single heat pulse, but multiple short heating pulses are preferred to avoid overheating of the heating elements. When a thermal head is used a foil can be used between the thermal head and the non-transparent microvoided biaxially stretched self-supporting film during the heating process e.g. a 6 μm thick PET-film can be interposed between the non-transparent microvoided film and the thermal head to prevent possible contamination of the thermal head. Thermal head printers, such as the DRYSTAR-printers supplied by AGFA-GEVAERT N.V., can be used produce the transparent pattern of the present invention e.g. as personalized watermarks.

This transparentization effect is accompanied by a relief pattern, which can be detected by touch i.e. in a tactile manner, and by changes in glossiness. This relief pattern is more pronounced the higher the temperature of the heat source e.g. in the case of A SAN-polymer as dispersed phase this embossing effect increasing with temperature between 110° C. and 190° C. The tactile relief obtained by applying a hot stamp to a non-transparent microvoided biaxially stretched self-supporting film is much more pronounced than that obtained using a thermal head.

The degree of transparency realized depends upon the stamp/thermal head printing conditions: time, temperature and pressure. The thermofixation history of the material is also important. The heated-induced transparentization of the non-transparent microvoided biaxially stretched self-supporting film can be carried out before or after the optional application of a layer, such as an ink-jet receiving layer and before or after transparentization. The relative positioning of the transparentized areas and transparency in the support can be of value as an additional security measure.

According to a second embodiment of the process for obtaining a transparent pattern, according to the present invention, the heat is applied non-continuously.

According to a third embodiment of the process for obtaining a transparent pattern, according to the present invention, a transparent overprintable layer is provided on the film prior to the image-wise application of heat.

According to a fourth embodiment of the process for obtaining a transparent pattern, according to the present invention, a transparent overprintable layer is provided on the film after the image-wise application of heat.

INDUSTRIAL APPLICATION

Non-transparent microvoided axially stretched films, according to the present invention, can be used as synthetic paper for printing and other applications, as a relector in LCD displays and photovoltaic devices, as a support for imaging materials e.g. impact and non-impact (e.g. electrophotography, electrography and ink jet) receiving materials, photothermographic recording materials, substantially light-insensitive thermographic recording materials, dye sublimation printing, thermal transfer printing, etc., in security and anti-counterfeiting applications e.g. in tickets, labels, tags, an ID-card, a bank card, a legal document, banknotes and packaging and can also be integrated into packaging.

The invention is illustrated hereinafter by way of comparative examples and examples. The percentages and ratios given in these examples are by weight unless otherwise indicated. Subbing layer Nr. 01 on the emulsion side of the support:

| | |
|---|---|
| copolymer of 88% vinylidene chloride, 10% methyl acrylate and 2% itaconic acid | 79.1 mg/m² |
| Kieselsol ® 100F, a colloidal silica from BAYER | 18.6 mg/m² |
| Mersolat ® H, a surfactant from BAYER | 0.4 mg/m² |
| Ultravon ® W, a surfactant from CIBA-GEIGY | 1.9 mg/m² |

Ingredients Used in the Examples:
Polyester:

| PET-nr | | | | MFI 270° C./ 1.20 kg [cm³/10 min] | Inherent viscosity **[η] [dl/g] | $T_g$ [° C.] |
|---|---|---|---|---|---|---|
| 01 | T03* | | polyethylene terephthalate | 34.8 | 0.60 | 80.5 |
| 02 | T04* | | polyethylene terephthalate | 34.8 | 0.60 | 80.5 |
| 03 | WP75# | | polyester of 98.5 mol% terephthalate, 1.5 mol % isophthalate and 100 mol % ethylene units | | 0.77 | 80 |
| 04 | DP9990# | | polyester of 90 mol % terephthalate, 10 mol % isophthalate and 100 mol % ethylene units | | 0.60 | |

-continued

| PET-nr | | | MFI 270° C./ 1.20 kg [cm³/10 min] | Inherent viscosity **[η] [dl/g] | $T_g$ [° C.] |
|---|---|---|---|---|---|
| 05 | DP9730# | polyester of 70 mol% terephthalate, 30 mol % isophthalate and 100 mol % ethylene units | | | |

*AGFA-GEVAERT N.V.
La Seda
**inherent viscosity was determined in a 0.5 g/dL solution of 60 wt % phenol and 40 wt % ortho-dichlorobenzene at 25° C. in an Ubbelohde viscometer Styrene-Acrylonitrile Copolymers:

| SAN-nr | | Wt % acrylonitrile | Wt % styrene | MFI at 270° C./1.20 kg [mL/10 min] | Mn | Mw | $T_g$ [° C.] |
|---|---|---|---|---|---|---|---|
| 01 | TYRIL 905* | 20 | 80 | 7.1 | | | 105.2 |
| 02 | TYRIL 867E* | 25 | 75 | 5.8 | | | 106.5 |
| 03 | SAN 140* | 27.5 | 72.5 | 53.2 | 47,640 | 99,820 | 108.8 |
| 04 | LURAN 368R# | 28 | 72 | 3.9 | | | 107.3 |
| 05 | TYRIL 790* | 29 | 71 | 12.1 | | | 106.3 |
| 06 | SAN 124* | 28.5 | 71.5 | 37.9 | 53,940 | 109,350 | 108.1 |
| 07 | LURAN 388S# | 33 | 67 | 3.6 | | | 108.7 |

*DOW CHEMICAL
BASF
MFI = Melt Flow Index

MAGNUM 8391: an ABS resin with a Vicat softening temperature of 95° C. from DOW CHEMICAL TPX® DX820: a high rigidity poly(4-methylpentene) from MITSUI CHEMICAL TITANIUM DIOXIDE: Renol-white/PTX 506, a masterbatch from CLARIANT GmbH containing 65% by weight $TiO_2$ and 35 wt % polyester Comparative Examples 1 to 3

The PET-types and SAN-types used for producing the extrudates used in producing of the films of COMPARATIVE EXAMPLES 1 to 3 are given in Table 3. The PET, SAN, $TiO_2$ and UVITEX OB-one in the weight percentages given in Table 1 were mixed and then dried at 150° C. for 4 hours under vacuum (<100 mbar), the mixtures then melted in a PET-extruder and extruded through a sheet die and cooled to produce the extrudates of COMPARATIVE EXAMPLES 1 to 3.

TABLE 1

| Comparative Example nr | PET01 [wt %] | PET02 [wt %] | PET03 [wt %] | SAN type | $TiO_2$ [wt %] | OB-one [ppm] |
|---|---|---|---|---|---|---|
| 1 | 98 | — | — | — | 2 | 150 |
| 2 | 47 | — | 47 | — | 6 | — |
| 3 | 44 | — | 44 | — | 12 | — |

The extrudates of COMPARATIVE EXAMPLES 1 to 3 were then longitudinally stretched with an INSTRON apparatus in which the extrudates are heated in an oven mounted on the apparatus under the conditions given in Table 2 to yield the axially stretched films of COMPARATIVE EXAMPLES 1/LS1, 2/LS1 and 3/LS1 respectively.

TABLE 2

| Comparative Example nr. | Stretch ratio | Stretch force [N/mm²] | Thickness [μm] | OD TR924 |
|---|---|---|---|---|
| 1/LS1 | 3.3 | 6.0 | 319 | 0.81 |
| 2/LS1 | 3.3 | 5.0 | 340 | 1.26 |
| 3/LS1 | 3.3 | 5.0 | 335 | 1.59 |

Transversal stretching was then performed on the longitudinally stretched films with a stretch time of 30 s and stretching speed of 1000%/min under the conditions given in Table 3. Finally the films were thermally fixated at 175° C. for 1 minute giving the substantially opaque films of COMPARATIVE EXAMPLES 1/LS1, 2/LS2 and 3/LS3.

The optical densities of the films of COMPARATIVE EXAMPLES 1/LS1/BS1, 2/LS1/BS1 and 3/LS1/BS1 were measured in transmission mode with a MACBETH TR924 densitometer with a visible filter and the results given in Table 3.

TABLE 3

| Comparative Example nr. | Stretch ratio | Stretch temperature [° C.] | Thickness [μm] | OD (TR924) after thermal fixation |
|---|---|---|---|---|
| 1/LS1/BS1 | 3.3 | 135 | 120 | 0.45 |
| 2/LS1/BS1 | 3.3 | 135 | 140 | 0.90 |
| 3/LS1/BS1 | 3.3 | 135 | 135 | 1.12 |

* the higher the stretching tension the lower the stretch temperature

The films of COMPARATIVE EXAMPLES 1/LS/BS, 2/LS/BS and 3/LS/BS were each mounted in an Instron 4411 apparatus and were heated at various temperatures between 120 and 190° C. for 5 seconds with a soldering iron in the upper clamp making contact with the film at a pressure of 0.5 N/mm². The optical densities of the film after the tests were measured in transmission with a MacBeth TR924 densitometer with a visible filter and the film thicknesses were also measured. The results are summarized below in Tables 4 and 5 respectively.

TABLE 4

| Film of Comparative Example nr | OD before heating | OD after heating for 5 s at a pressure of 0.5 N/mm² at | | | | | ΔOD at 150° C. | reduction in OD |
|---|---|---|---|---|---|---|---|---|
| | | 120° C. | 130° C. | 150° C. | 170° C. | 190° C. | | |
| 1/LS/BS | 0.45 | 0.47 | 0.46 | 0.46 | 0.47 | 0.45 | −0.01 | −0.01 |
| 2/LS/BS | 0.90 | 0.90 | 0.91 | 0.89 | 0.88 | 0.85 | 0.01 | 0.01 |
| 3/LS/BS | 1.12 | 1.14 | 1.14 | 1.11 | 1.11 | 1.08 | 0.01 | 0.01 |

TABLE 5

| Film of Comparative Example nr | Layer thickness before heating | Layer thickness after heating for 5 s at a pressure of 0.5 N/mm² at | | | | |
|---|---|---|---|---|---|---|
| | | 120° C. | 130° C. | 150° C. | 170° C. | 190° C. |
| 1/LS/BS | 93 | 92 | 91 | 93 | 92 | 85 |
| 2/LS/BS | 138 | 139 | 142 | 137 | 132 | 115 |
| 3/LS/BS | 137 | 136 | 135 | 139 | 131 | 119 |

Within experimental error no transparentization was observed upon heating the films of COMPARATIVE EXAMPLES 1/LS/BS, 2/LS/BS and 3/LS/BS. This shows that in the absence of dispersed SAN-polymer particles there is no transparentization of films containing titanium dioxide i.e. there is no micro-void formation.

Comparative Example 4

The 1083 μm thick extrudate of COMPARATIVE EXAMPLE 4 with a composition of 2% by weight of titanium dioxide, 100 ppm UVITEX OB-one and 98% by weight of PET02 was produced as described for COMPARATIVE EXAMPLES 1 to 3 and had an optical density measured with a MacBeth TR924 densitometer in transmission mode with a visible filter of 1.35. The extrudate was stretched in the length direction as described in COMPARATIVE EXAMPLES 1 to 3 under the conditions given in Table 6. The thickness values were measured by averaging measurements obtained by contacting the upper surface at 16 different positions at a measuring force of 0.8N using a SONY U30A thickness gauge with a resolution of 1 μm, an accuracy of 2 μm and a contact ball 3 mm in diameter.

TABLE 6

| Comparative Example nr. | Stretch ratio | Stretch force [N/mm²] | Thickness [μm] | OD (TR924) | OD [X-rite] |
|---|---|---|---|---|---|
| 4/LS1 | 3.3 | 6 | 323 | 0.805 | 0.55 |
| 4/LS2 | 3.3 | 4 | 328 | 0.84 | — |

Transversal stretching was then performed on the longitudinally stretched films with a stretch time of 30 s and stretching speed of 1000%/min under the conditions given in Table 7. The measured thickness and measured optical density with the MacBeth TR924 densitometer in transmission mode with a visible filter are also given in Table 7.

TABLE 7

| Comparative Example nr. | Stretch ratio | Stretch temperature [° C.] | Thickness [μm] | OD TR924 | OD [X-rite] |
|---|---|---|---|---|---|
| 4/LS1/BS1 | 3.3 | 135 | 120 | 0.47 | 0.30 |
| 4/LS2/BS1 | 3.3 | 135 | 124 | 0.53 | 0.33 |

Since there is no contribution to the optical density from void-forming upon biaxial stretching for the composition of COMPARATIVE EXAMPLE 4 as can be seen from COMPARATIVE EXAMPLE 1 to 3, the dependence of optical density upon film thickness can be used to provide a baseline with which to assess the contribution of void-forming to the optical density for those compositions based upon aromatic polyesters with 2% by weight of the same titanium dioxide pigment which form voids upon biaxial stretching.

The Beer-Lambert relationship does not hold for pigmented films with light-scattering pigments such as titanium dioxide. If the film thickness is smaller than the average free path-length of the scattered light, light will escape after scattering otherwise the light does not escape and in fact interferes with further scattered light providing for a quasi-exponential dependence of optical density upon film thickness. The situation is too complex to be able to be described theoretically and hence the only possible approach is to measure the actual optical density observed at particular film thicknesses. The above-mentioned optical density appear to a fair approximation to bee linearly dependent upon the logarithm of the film thickness in the layer thickness range 1084 to 120 μm giving the following relationship:

$$OD = 0.891 \log[\text{thickness in μm}] - 1.3727$$

This relationship provides the optical density attributable to a 2% by weight concentration of the titanium dioxide pigment used as a function of film thickness.

Comparative Example 5 and Invention Examples 1 to 17

The ca. 1100 μm thick extrudates of COMPARATIVE EXAMPLE 5 and INVENTION EXAMPLES 1 to 17 all with 2% by weight of titanium dioxide and 15% by weight of SAN 06 were produced by mixing the ingredients in Table 8 in the proportions given in Table 8 and then drying the mixture at 150° C. for 4 hours under vacuum (<100 mbar) before melting in a PET-extruder, extrusion through a sheet die and cooling to produce the extrudates of COMPARATIVE EXAMPLE 5 and INVENTION EXAMPLES 1 to 17 having a density of ca. 1.3 g/mL as summarized in Table 8 together with the isophthalate (IPA):terephthalate (TPA) ratio.

TABLE 8

| | PET02 [wt %] | PET04 [wt %] | PET05 [wt %] | IPA:TPA ratio | SAN type | SAN [wt %] | UVITEX OB-one [ppm] | TiO$_2$ [wt %] | Density [g/mL] |
|---|---|---|---|---|---|---|---|---|---|
| Comparative example nr. | | | | | | | | | |
| 5 | 83 | 0 | — | 0 | 06 | 15 | — | 2.0 | 1.294 |
| Invention example nr. | | | | | | | | | |
| 1 | 58 | 25 | — | 0.0310 | 06 | 15 | — | 2.0 | 1.289 |
| 2 | 41.5 | 41.5 | — | 0.0526 | 06 | 15 | 100 | 2.0 | 1.284 |
| 3 | 33.35 | 49.7 | — | 0.0636 | 06 | 15 | — | 1.95 | |
| 4 | 33.3 | 49.7 | — | 0.0637 | 06 | 15 | 100 | 2.0 | |
| 5 | 32.3 | 50.7 | — | 0.0650 | 06 | 15 | 100 | 2.0 | |
| 6 | 32.3 | 50.7 | — | 0.0650 | 06 | 15 | 100 | 2.0 | |
| 7 | 26.29 | 56.71 | — | 0.0733 | 06 | 15 | 100 | 2.0 | |
| 8 | 25.25 | 57.75 | — | 0.0748 | 06 | 15 | 100 | 2.0 | |
| 9 | 25 | 58 | — | 0.0751 | 06 | 15 | 100 | 2.0 | 1.304 |
| 10 | 24.3 | 58.7 | — | 0.0761 | 06 | 15 | 100 | 2.0 | |
| 11 | 1.05 | 82.0 | — | 0.109 | 06 | 15 | — | 1.95 | |
| 12 | — | 83 | — | 0.111 | 06 | 15 | — | 2.0 | 1.299 |
| 13 | — | 83 | — | 0.111 | 06 | 15 | 100 | 2.0 | |
| 14 | 28.25 | 22.3 | 32.5 | 0.168 | 06 | 15 | 100 | 1.95 | |
| 15 | 14.85 | 22.3 | 45.9 | 0.239 | 06 | 15 | — | 1.95 | |
| 16 | 1.05 | 22.3 | 59.7 | 0.320 | 06 | 15 | — | 1.95 | |
| 17 | 1.05 | — | 82.0 | 0.421 | 06 | 15 | — | 1.95 | |

Longitudinal stretching was carried out for each extrudate as described in COMPARATIVE EXAMPLES 1 to 3 under the conditions given in Table 11. The expected thickness is the thickness based on the extrudate thickness and longitudinal as observed for non-voided films.

Longitudinal stretching was accompanied by a decrease in density due to void-forming, this decrease in density clearly increasing as the IPA:TPA ratio increases, surprisingly indicates that an increase in the IPA:TPA ratio favours increased void-forming in the film.

TABLE 11

| | IPA:TPA ratio | Longitudinal stretch temperature [° C.] | V1 ratio | speed [m/min] | force [N/mm$^2$] | Density [g/mL] | Thickness [μm] Measured | Thickness [μm] Expected |
|---|---|---|---|---|---|---|---|---|
| Comparative example nr | | | | | | | | |
| 5/LS1 | 0 | | 3.85 | 4.0 | 8 | 1.290 | 320 | 286 |
| Invention example nr | | | | | | | | |
| 1/LS1 | 0.0310 | | 3.85 | 4.0 | 8 | 1.264 | 325 | 286 |
| 1/LS2 | 0.0310 | | 3.65 | 4.0 | 8 | | 323 | 301 |
| 2/LS1 | 0.0526 | | 3.85 | 4.0 | 8 | 1.251 | 318 | 286 |
| 3/LS1 | 0.0636 | 92 | 3.3 | 4.0 | 8.0 | | 380 | 333 |
| 3/LS2 | 0.0636 | 80 | 3.3 | 4.0 | 9.0-9.5 | | 380 | 333 |
| 3/LS3 | 0.0636 | 108 | 3.3 | 4.0 | 7.5 | | 375 | 333 |
| 4/LS1 | 0.0637 | 101 | 3.3 | 4.0 | 8 | 1.216 | 350 | 333 |
| 4/LS2 | 0.0637 | 116 | 3.3 | 4.0 | 8 | 1.283 | 330 | 333 |
| 5/LS1 | 0.0650 | | 3.3 | 4.0 | 8.6 | | 365 | 333 |
| 6/LS1 | 0.0650 | 120 | 3.8 | 4.0 | 8 | | 300 | 290 |
| 6/LS2 | 0.0650 | 96 | 3.6 | 4.0 | 8 | | 335 | 305 |
| 6/LS3 | 0.0650 | 85 | 3.45 | 4.0 | 8 | | 350 | 319 |
| 7/LS1 | 0.0733 | 92 | 3.3 | 4.0 | 8 | 1.229 | 360 | 333 |
| 8/LS1 | 0.0748 | 95 | 3.3 | 4.0 | 8 | 1.242 | 330 | 333 |
| 9/LS1 | 0.0751 | | 3.85 | 4.0 | 8 | 1.217 | 330 | 286 |
| 10/LS1 | 0.0761 | 94 | 3.3 | 4.0 | 8 | 1.216 | 350 | 333 |
| 10/LS2 | 0.0761 | 110 | 3.3 | 4.0 | 7 | 1.258 | 333 | 333 |
| 11/LS1 | 0.109 | 96 | 3.3 | 4.0 | 8.0 | | 370 | 333 |
| 11/LS2 | 0.109 | 84 | 3.3 | 4.0 | 9.0-9.5 | | 385 | 333 |
| 12/LS1 | 0.111 | | 3.85 | 4.0 | 8 | 1.125 | 345 | 286 |
| 12/LS2 | 0.111 | | 3.65 | 4.0 | 8 | | 380 | 301 |
| 13/LS1 | 0.111 | | 3.85 | 4.0 | 8 | | 320 | 286 |
| 13/LS2 | 0.111 | | 3.85 | 4.0 | 5 | | | 286 |
| 13/LS3 | 0.111 | | 3.85 | 4.0 | 6 | | | 286 |
| 14/LS1 | 0.168 | 85 | 3.3 | 4.0 | 8.2 | | 393 | 333 |
| 15/LS1 | 0.239 | 86 | 3.3 | 4.0 | 6.0 | | 390 | 333 |
| 16/LS1 | 0.320 | 79 | 3.3 | 4.0 | 8.0 | | 392 | 327 |

TABLE 11-continued

| | IPA:TPA ratio | Longitudinal stretch temperature [° C.] | ratio | V1 speed [m/min] | force [N/mm$^2$] | Density [g/mL] | Thickness [μm] Measured | Thickness [μm] Expected |
|---|---|---|---|---|---|---|---|---|
| 16/LS2 | 0.321 | 85 | 3.3 | 4.0 | 7.0 | | 400 | 327 |
| 17/LS1 | 0.421 | 82 | 3.3 | 4.0 | 6.0 | | 375 | 333 |
| 17/LS2 | 0.421 | 87 | 3.3 | 4.0 | 5.0 | | 380 | 333 |

Table 10 gives the measured thickness; the expected thickness i.e. thickness if no void-forming on the basis of the extrudate thickness and the longitudinal and transversal stretch ratios, the measured optical density with the MacBeth TR924 densitometer in transmission mode with a visible filter, the expected optical density, i.e. the optical density calculated using the relationship disclosed in COMPARATIVE EXAMPLE 4 using the theoretical layer thickness values, and the difference between the observed optical density and the optical density expected due to a 2% by weight concentration of the particular titanium dioxide pigment used, ΔOD.

The increase in optical density due to void forming was in the range of 17 to 36%. Moreover, the optical density values for INVENTION EXAMPLES 13/LS1, 13/LS2 and 13/LS3 clearly show the impact of the longitudinal stretching force with the highest optical density value of 1.24 being obtained with the film of INVENTION EXAMPLE 13/LS1 with the highest longitudinal stretching force of 8 N/mm$^2$ compared with 1.02 and 1.10 obtained with the films of INVENTION EXAMPLE 13/LS2 and 13/LS3 respectively with longitudinal stretching forces of 5 N/mm$^2$ and 6 N/mm$^2$ respectively.

TABLE 10

| | IPA:TPA ratio | Thickness [μm] | V1 speed [m/min] | Expected thickness [μm] | OD TR924 | Expected OD | ΔOD | ΔOD/ OD | OD [X-rite] |
|---|---|---|---|---|---|---|---|---|---|
| Comparative example nr |  |  |  |  |  |  |  |  |  |
| 5/LS1 | 0 | 320 | 4.0 | 286 | 1.00 | 0.81 | 0.19 | 0.19 | 0.76 |
| Invention example nr. |  |  |  |  |  |  |  |  |  |
| 1/LS1 | 0.0310 | 325 | 4.0 | 286 | 1.05 | 0.81 | 0.24 | 0.23 | 0.82 |
| 1/LS2 | 0.0310 | 323 | 4.0 | 301 | 1.00 | 0.83 | 0.17 | 0.17 | 0.78 |
| 2/LS1 | 0.0526 | 318 | 4.0 | 286 | 1.06 | 0.81 | 0.25 | 0.23 | 0.85 |
| 3/LS1 | 0.0636 | 380 | 4.0 | 333 | 1.17 | 0.87 | 0.30 | 0.26 | 0.96 |
| 3/LS2 | 0.0636 | 380 | 4.0 | 333 | 1.15 | 0.87 | 0.28 | 0.24 | 0.97 |
| 3/LS3 | 0.0636 | 375 | 8.0 | 333 | 1.12 | 0.87 | 0.25 | 0.22 | 0.92 |
| 4/LS1 | 0.0637 | 350 | 4.0 | 333 | 1.21 | 0.87 | 0.34 | 0.28 | 0.98 |
| 4/LS2 | 0.0637 | 330 | 4.0 | 333 | 1.02 | 0.87 | 0.15 | 0.15 | 0.80 |
| 5/LS1 | 0.0650 | 365 | 4.0 | 333 | | 0.87 | | | |
| 6/LS1 | 0.0650 | 300 | 4.0 | 290 | | | | | |
| 6/LS2 | 0.0650 | 335 | 4.0 | 305 | | | | | |
| 6/LS3 | 0.0650 | 350 | 4.0 | 319 | | | | | |
| 7/LS1 | 0.0733 | 360 | 4.0 | 333 | 1.17 | 0.87 | 0.30 | 0.26 | 0.97 |
| 8/LS1 | 0.0748 | 330 | 4.0 | 333 | 1.08 | 0.87 | 0.21 | 0.19 | 0.90 |
| 9/LS1 | 0.0751 | 330 | 4.0 | 286 | 1.13 | 0.81 | 0.32 | 0.28 | 0.92 |
| 10/LS1 | 0.0761 | 350 | 4.0 | 333 | 1.18 | 0.87 | 0.31 | 0.26 | 1.00 |
| 10/LS2 | 0.0761 | 333 | 4.0 | 333 | 1.10 | 0.87 | 0.23 | 0.21 | 0.89 |
| 11/LS1 | 0.109 | 370 | 4.0 | 333 | 1.15 | 0.87 | 0.28 | 0.24 | 0.93 |
| 11/LS2 | 0.109 | 385 | 4.0 | 333 | 1.28 | 0.87 | 0.41 | 0.32 | 1.01 |
| 12/LS1 | 0.1111 | 345 | 4.0 | 286 | 1.20 | 0.81 | 0.39 | 0.32 | 1.02 |
| 12/LS2 | 0.1111 | 380 | 4.0 | 301 | 1.23 | 0.83 | 0.40 | 0.32 | 1.00 |
| 13/LS1 | 0.1111 | 320 | 4.0 | 286 | 1.24 | 0.81 | 0.43 | 0.35 | 1.00 |
| 13/LS2 | 0.1111 | | 4.0 | 286 | 1.02 | 0.81 | 0.21 | 0.20 | 0.83 |
| 13/LS3 | 0.1111 | | 4.0 | 286 | 1.10 | 0.81 | 0.29 | 0.26 | 0.83 |
| 14/LS1 | 0.168 | 393 | 4.0 | 333 | 1.15 | 0.87 | 0.28 | 0.24 | 0.97 |
| 15/LS1 | 0.239 | 390 | 4.0 | 333 | 1.12 | 0.87 | 0.25 | 0.22 | 0.91 |
| 16/LS1 | 0.320 | 392 | 4.0 | 327 | 1.37 | 0.87 | 0.50 | 0.36 | 1.10 |
| 16/LS2 | 0.320 | 400 | 4.0 | 327 | 1.10 | 0.87 | 0.23 | 0.21 | 0.89 |
| 17/LS1 | 0.421 | 375 | 4.0 | 333 | 1.13 | 0.87 | 0.26 | 0.23 | 0.76 |
| 17/LS2 | 0.421 | 380 | 4.0 | 333 | 0.97 | 0.87 | 0.10 | 0.10 | 0.89 |

Transversal stretching was then performed on the longitudinally stretched films with a stretch time of 30 s and stretching speed of 1000%/min under the conditions given in Table 11. The density, measured thickness and the expected thickness, i.e. thickness if no void-forming on the basis of the extrudate thickness and the longitudinal and transversal stretch ratios, are also given in Table 11.

low temperatures as 85° C., which is less than 10° C. above the glass transition temperature of the linear polyester matrix. This enables much higher optical densities to be realized by biaxial stretching.

Table 12 gives the measured thickness, the expected thickness, the measured optical density with the MacBeth TR924

TABLE 11

| | IPA:TPA ratio | Transversal stretch temperature [° C.] | ratio | speed [%/min] | Density [g/mL] | Measured thickness [μm] | Expected thickness [μm] |
|---|---|---|---|---|---|---|---|
| Comparative Example nr | | | | | | | |
| 5/LS1/BS1 | 0 | 135 | 3.3 | 1000 | 1.284 | 101 | 87 |
| Invention example nr | | | | | | | |
| 1/LS1/BS1 | 0.031 | 134 | 3.3 | 1000 | 1.219 | 95 | 87 |
| 1/LS2/BS1 | 0.031 | 135 | 3.3 | 1000 | | 102 | 91 |
| 2/LS1/BS1 | 0.0526 | 132 | 3.3 | 1000 | | 100 | 87 |
| 2/LS1/BS2 | 0.0526 | | | 1000 | 1.234 | 97 | 87 |
| 3/LS1/BS1 | 0.0636 | 100 | 3.5 | 1000 | | 145 | 95 |
| 3/LS2/BS1 | 0.0636 | 105 | 3.5 | 1000 | | 150 | 95 |
| 3/LS3/BS1 | 0.0636 | 95 | 3.5 | 1000 | | 126 | 95 |
| 4/LS1/BS1 | 0.0637 | 100 | 3.5 | 1000 | 1.074 | 140 | 95 |
| 4/LS1/BS2 | 0.0637 | 96 | 3.5 | 1000 | 1.002 | 135 | 95 |
| 4/LS2/BS1 | 0.0637 | 96 | 3.5 | 1000 | 1.158 | 116 | 95 |
| 5/LS1/BS1 | 0.0650 | 132 | 3.3 | 1000 | 1.228 | 140 | 101 |
| 6/LS1/BS1 | 0.0650 | 122 | 3.3 | 1000 | | 110 | 88 |
| 6/LS2/BS1 | 0.0650 | 122 | 3.3 | 1000 | | 135 | 93 |
| 6/LS3/BS1 | 0.0650 | 122 | 3.3 | 1000 | | 150 | 97 |
| 7/LS1/BS1 | 0.0733 | 95 | 3.5 | 1000 | 1.071 | 145 | 95 |
| 8/LS1/BS1 | 0.0748 | 96 | 3.5 | 1000 | 1.070 | 138 | 95 |
| 9/LS1/BS1 | 0.0751 | 134 | 3.3 | 1000 | 1.195 | 105 | 87 |
| 10/LS1/BS1 | 0.0761 | 95 | 3.5 | 1000 | 1.055 | 147 | 95 |
| 10/LS2/BS1 | 0.0761 | 95 | 3.5 | 1000 | 1.140 | 112 | 95 |
| 11/LS1/BS1 | 0.109 | 92 | 3.5 | 1000 | | 207 | 95 |
| 11/LS1/BS2 | 0.109 | 85 | 3.5 | 1000 | | 199 | 95 |
| 11/LS1/BS3 | 0.109 | 83 | 3.5 | 1000 | | 198 | 95 |
| 11/LS2/BS1 | 0.109 | 92 | 3.5 | 1000 | | 205 | 95 |
| 11/LS2/BS2 | 0.109 | 85 | 3.5 | 1000 | | 210 | 95 |
| 11/LS2/BS3 | 0.109 | 81 | 3.5 | 1000 | | 214 | 95 |
| 12/LS1/BS1 | 0.1111 | 135 | 3.3 | 1000 | 0.990 | 169 | 87 |
| 12/LS2/BS1 | 0.1111 | 135 | 3.3 | 1000 | | 185 | 91 |
| | | | | | | 156 | |
| 12/LS1/BS1 | 0.1111 | 110 | 3.3 | 1000 | 1.121 | 130 | 86 |
| 13/LS2/BS1 | 0.1111 | 110 | 3.3 | 1000 | | 125 | 86 |
| 13/LS3/BS1 | 0.1111 | 110 | 3.3 | 1000 | | 120 | 86 |
| 14/LS1/BS1 | 0.168 | 89 | 3.5 | 1000 | | 198 | 95 |
| 14/LS1/BS2 | 0.168 | 84 | 3.5 | 1000 | | 201 | 95 |
| 14/LS1/BS3 | 0.168 | 78 | 3.5 | 1000 | | 204 | 95 |
| 15/LS1/BS1 | 0.239 | 89 | 3.5 | 1000 | | 191 | 95 |
| 15/LS1/BS2 | 0.239 | 84 | 3.5 | 1000 | | 186 | 95 |
| 16/LS1/BS1 | 0.320 | 92 | 3.5 | 1000 | | 211 | 95 |
| 16/LS1/BS2 | 0.320 | 86 | 3.5 | 1000 | | 210 | 95 |
| 16/LS2/BS1 | 0.320 | 92 | 3.5 | 1000 | | 190 | 95 |
| 16/LS2/BS2 | 0.320 | 86 | 3.5 | 1000 | | 200 | 95 |
| 17/LS1/BS1 | 0.421 | 92 | 3.5 | 1000 | | 190 | 95 |
| 17/LS1/BS2 | 0.421 | 90 | 3.5 | 1000 | | 170 | 95 |
| 17/LS1/BS3 | 0.421 | 85 | 3.5 | 1000 | | 170 | 95 |
| 17/LS2/BS1 | 0.421 | 92 | 3.5 | 1000 | | 150 | 95 |
| 17/LS2/BS2 | 0.421 | 85 | 3.5 | 1000 | | 150 | 95 |

Transversal stretching reduced the density of the films still further with again the density decrease being greater as the proportion of PET04 and PET05 increased. This again surprisingly indicates that an increase in the IPA:TPA ratio favoured increased void-forming in the film.

At an IPA:TPA ratio of 0.0650 transversal stretching was surprisingly not possible above 113° C., but was possible at as densitometer in transmission mode with a visible filter, the expected optical density, i.e. the optical density calculated using the relationship disclosed in COMPARATIVE EXAMPLE 4 using the theoretical layer thickness values, and the difference between the observed optical density and the optical density expected due to a 2% by weight concentration of the particular titanium dioxide pigment used, ΔOD.

TABLE 12

| | IPA:TPA ratio | V1 (LS) speed [m/min] | Thickness [μm] | Expected thickness [μm] | OD TR924 | Expected OD | ΔOD | ΔOD/OD | OD [X-rite] |
|---|---|---|---|---|---|---|---|---|---|
| Comparative Example nr. | | | | | | | | | |
| 5/LS1/BS1 | 0 | 4.0 | 101 | 87 | 1.00 | 0.35 | 0.65 | 0.65 | 0.78 |
| Invention example nr | | | | | | | | | |
| 1/LS1/BS1 | 0.0310 | 4.0 | 95 | 87 | 1.01 | 0.35 | 0.66 | 0.65 | 0.78 |
| 1/LS2/BS1 | 0.0310 | 4.0 | 102 | 91 | 0.99 | 0.37 | 0.62 | 0.63 | 0.75 |
| 2/LS1/BS1 | 0.0526 | 4.0 | 100 | 87 | 1.04 | 0.35 | 0.69 | 0.66 | 0.80 |
| 2/LS1/BS2 | 0.0526 | 4.0 | 97 | 87 | (1.04) | (0.35) | (0.69) | 0.66 | (0.80) |
| 3/LS1/BS1 | 0.0636 | 4.0 | 145 | 95 | 1.02 | 0.39 | 0.63 | 0.62 | 0.85 |
| 3/LS2/BS1 | 0.0636 | 4.0 | 150 | 95 | 1.11 | 0.39 | 0.72 | 0.65 | 0.90 |
| 3/LS3/BS1 | 0.0636 | 8.0 | 126 | 95 | 1.03 | 0.39 | 0.64 | 0.62 | 0.77 |
| 4/LS1/BS1 | 0.0637 | 4.0 | 140 | 95 | 1.20 | 0.39 | 0.81 | 0.67 | 0.97 |
| 4/LS1/BS2 | 0.0637 | 4.0 | 135 | 95 | 1.25 | 0.39 | 0.86 | 0.69 | 1.00 |
| 4/LS2/BS1 | 0.0637 | 4.0 | 116 | 95 | 1.10 | 0.39 | 0.71 | 0.64 | 0.86 |
| 5/LS1/BS1 | 0.0650 | 4.0 | 140 | 101 | 1.10 | 0.41 | 0.69 | 0.63 | 0.85 |
| 6/LS1/BS1 | 0.0650 | 4.0 | 110 | 88 | 1.06 | 0.36 | 0.70 | 0.66 | 0.84 |
| 6/LS2/BS1 | 0.0650 | 4.0 | 135 | 93 | 1.18 | 0.38 | 0.80 | 0.68 | 0.94 |
| 6/LS3/BS1 | 0.0650 | 4.0 | 150 | 97 | 1.11 | 0.40 | 0.71 | 0.64 | 0.88 |
| 7/LS1/BS1 | 0.0733 | 4.0 | 145 | 95 | 1.21 | 0.39 | 0.82 | 0.68 | 0.94 |
| 8/LS1/BS1 | 0.0748 | 4.0 | 138 | 95 | 1.20 | 0.39 | 0.81 | 0.67 | 0.97 |
| 9/LS1/BS1 | 0.0751 | 4.0 | 105 | 87 | 1.10 | 0.35 | 0.75 | 0.68 | 0.90 |
| 10/LS1/BS1 | 0.0761 | 4.0 | 147 | 95 | 1.20 | 0.39 | 0.81 | 0.67 | 0.97 |
| 10/LS2/BS1 | 0.0761 | 4.0 | 112 | 95 | 1.05 | 0.39 | 0.66 | 0.63 | 0.82 |
| 11/LS1/BS1 | 0.109 | 4.0 | 207 | 95 | 1.26 | 0.39 | 0.87 | 0.69 | 1.04 |
| 11/LS1/BS2 | 0.109 | 4.0 | 199 | 95 | 1.28 | 0.39 | 0.89 | 0.69 | 1.04 |
| 11/LS1/BS3 | 0.109 | 4.0 | 198 | 95 | 1.27 | 0.39 | 0.88 | 0.69 | 1.03 |
| 11/LS2/BS1 | 0.109 | 4.0 | 205 | 95 | 1.34 | 0.39 | 0.95 | 0.71 | 1.12 |
| 11/LS2/BS2 | 0.109 | 4.0 | 210 | 95 | 1.34 | 0.39 | 0.95 | 0.71 | 1.08 |
| 11/LS2/BS3 | 0.109 | 4.0 | 214 | 95 | 1.35 | 0.39 | 0.96 | 0.71 | 1.11 |
| 12/LS1/BS1 | 0.111 | 4.0 | 169 | 87 | 1.32 | 0.35 | 0.97 | 0.73 | 1.06 |
| 12/LS2/BS1 | 0.111 | 4.0 | 185 | 91 | 1.26 | 0.37 | 0.89 | 0.71 | 1.00 |
| | | | 156 | | | | | | |
| 12/LS1/BS1 | 0.111 | 4.0 | 130 | 86 | 1.24 | 0.35 | 0.89 | 0.72 | 1.00 |
| 13/LS2/BS1 | 0.111 | 4.0 | 125 | 86 | 0.95 | 0.35 | 0.60 | 0.63 | 0.74 |
| 13/LS3/BS1 | 0.111 | 4.0 | 120 | 86 | 0.98 | 0.35 | 0.63 | 0.64 | 0.74 |
| 14/LS1/BS1 | 0.168 | 4.0 | 198 | 95 | 1.30 | 0.39 | 0.91 | 0.70 | 1.05 |
| 14/LS1/BS2 | 0.168 | 4.0 | 201 | 95 | 1.28 | 0.39 | 0.89 | 0.69 | 1.04 |
| 14/LS1/BS3 | 0.168 | 4.0 | 204 | 95 | 1.30 | 0.39 | 0.91 | 0.70 | 1.08 |
| 15/LS1/BS1 | 0.239 | 4.0 | 191 | 95 | 1.20 | 0.39 | 0.81 | 0.67 | 0.99 |
| 15/LS1/BS2 | 0.239 | 4.0 | 186 | 95 | 1.19 | 0.39 | 0.80 | 0.67 | 0.97 |
| 16/LS1/BS1 | 0.320 | 4.0 | 211 | 95 | 1.26 | 0.39 | 0.87 | 0.69 | 1.00 |
| 16/LS1/BS2 | 0.320 | 4.0 | 210 | 95 | 1.30 | 0.39 | 0.91 | 0.70 | 1.08 |
| 16/LS2/BS1 | 0.320 | 4.0 | 190 | 95 | 1.19 | 0.39 | 0.80 | 0.67 | 0.95 |
| 16/LS2/BS2 | 0.320 | 4.0 | 200 | 95 | 1.21 | 0.39 | 0.82 | 0.68 | 0.98 |
| 17/LS1/BS1 | 0.421 | 4.0 | 190 | 95 | 1.14 | 0.39 | 0.75 | 0.66 | 0.91 |
| 17/LS1/BS2 | 0.421 | 4.0 | 170 | 95 | 1.14 | 0.39 | 0.75 | 0.66 | 0.90 |
| 17/LS1/BS3 | 0.421 | 4.0 | 170 | 95 | 1.16 | 0.39 | 0.77 | 0.66 | 0.91 |
| 17/LS2/BS1 | 0.421 | 4.0 | 150 | 95 | 1.03 | 0.39 | 0.64 | 0.62 | 0.81 |
| 17/LS2/BS2 | 0.421 | 4.0 | 150 | 95 | 1.07 | 0.39 | 0.68 | 0.63 | 0.83 |

The optical density values for INVENTION EXAMPLES 13/LS1/BS1, 13/LS2/BS1 and 13/LS3/BS1 clearly still show the impact of the longitudinal stretching force with the highest optical density value of 1.24 being obtained with the film of INVENTION EXAMPLE 13/LS1/BS1 with the highest longitudinal stretching force of 8 N/mm² compared with 0.95 and 0.98 obtained the films of INVENTION EXAMPLE 13/LS2/BS1 and 13/LS3/BS1 respectively with longitudinal stretching forces of 5 N/mm² and 6 N/mm² respectively.

The results of Table 12 show that at approximately the same stretching temperature the contribution to the optical density of biaxially stretched films of microvoiding increases to over 70% as the IPA:TPA ratio increases to 0.132. Above an IPA:TPA ratio of 0.132 there is a steady decrease to a still considerable contribution of 0.66 at an IPA:TPA ratio of 0.421, corresponding to 30 mole % isophthalate.

The presence of void-forming was demonstrated for several of the biaxially stretched films by clamping the films in an Instron 4411 apparatus and observing the changes in film thickness and optical density upon contacting the films with a soldering iron for 5 s at 150° C. The results of these experiments are given in Table 13.

TABLE 13

| Comparative example nr. | IPA:TPA ratio | OD (TR924) before heating | Thickness before heating [μm] | after 5 s heating at 150° C. at a pressure of 0.5 N/mm² OD (TR924) | after 5 s heating at 150° C. at a pressure of 0.5 N/mm² Thickness [μm] | % decrease in OD | Change in thickness at 150° C. [μm] |
|---|---|---|---|---|---|---|---|
| 5/LS1/BS1 | 0 | 1.03 | 103 | 0.62 | 94 | 40 | 9 |
| Invention example nr. | | | | | | | |
| 2/LS1/BS2 | 0.0526 | 1.05 | 97 | 0.58 | 87 | 45 | 10 |
| 9/LS1/BS1 | 0.0751 | 1.14 | 106 | 0.53 | 84 | 53 | 22 |
| 12/LS1/BS1 | 0.1111 | 1.34 | 168 | 0.83 | 110 | 38 | 58 |
| 12/LS2/BS1 | 0.1111 | 1.25 | 156 | 0.65 | 112 | 48 | 44 |

Example 18

The 1100 μm thick extrudate of EXAMPLE 18 having a composition of 2% by weight of titanium dioxide, 100 ppm of UVITEX OB-one [ppm], 15% by weight of SAN 06 and 83% by weight of PET04 giving an IPA:TPA ratio of 0.0650 was produced as described for COMPARATIVE EXAMPLES 1 to 3. Stretching in the length direction was carried out for the extrudate as described in COMPARATIVE EXAMPLE 1 to 3 under four different sets of conditions as given in Table 14. The expected thickness is the thickness based on the extrudate thickness and longitudinal as observed for non-voided films.

TABLE 14

| Invention Example nr. | Longitudinal stretch ratio | force [N/mm²] | temperature [° C.] | Thickness [μm] measured | Thickness [μm] expected | OD X-rite |
|---|---|---|---|---|---|---|
| 18/LS1 | 3.8 | 8.3 | 120 | 300 | 290 | 0.94 |
| 18/LS2 | 3.6 | 8.23 | 96 | 330 | 305 | 0.96 |

TABLE 14-continued

| Invention Example nr. | Longitudinal stretch ratio | force [N/mm²] | temperature [° C.] | Thickness [μm] measured | Thickness [μm] expected | OD X-rite |
|---|---|---|---|---|---|---|
| 18/LS3 | 3.3 | 8.6 | 90 | 365 | 333 | |
| 18/LS4 | 3.1 | 8.2 | 80 | 380 | 355 | |

Transversal stretching was then performed on the longitudinally stretched films as described in COMPARATIVE EXAMPLES 1 to 3 under the conditions given in Table 15. The density, measured thickness and the expected thickness, i.e. thickness if no void-forming on the basis of the extrudate thickness and the longitudinal and transversal stretch ratios, are also given in Table 15.

TABLE 15

| Invention Example nr. | Transverse stretch ratio | temperature [° C.] | time [s] | speed [%/min] | Density [g/mL] | Measured Thickness [μm] | Expected Thickness [μm] |
|---|---|---|---|---|---|---|---|
| 18/LS3/BS1 | 3.3 | 86 | 30 | 1000 | 0.984 | 199 | 101 |
| 18/LS3/BS2 | 3.3 | 91 | 30 | 1000 | 0.978 | 185 | 101 |
| 18/LS3/BS3 | 3.3 | 98 | 30 | 1000 | 0.993 | 180, 190 | 101 |
| 18/LS3/BS4 | 3.3 | 100 | 30 | 1000 | 1.117 | 165 | 101 |
| 18/LS3/BS5 | 3.3 | 100 | 30 | 1000 | | 150 | 101 |
| 18/LS3/BS6 | 3.5 | 100 | 30 | 1000 | 1.080 | 175 | 95 |
| 18/LS3/BS7 | | 101 | 30 | 1000 | | 105 | 101 |
| 18/LS3/BS8 | | 102 | 30 | 1000 | | 135 | 101 |
| 18/LS2/BS1 | 3.3 | 106 | 30 | 1000 | | 135 | 93 |
| 18/LS3/BS9 | 3.3 | 110 | 30 | 1000 | | 150 | 101 |
| 18/LS4/BS1 | 3.3 | 110 | 30 | 1000 | | 165 | 108 |
| 18/LS2/BS2 | 3.3 | 113 | 30 | 1000 | | 135 | 93 |
| 18/LS1/BS1 | 3.3 | 114 | 30 | 1000 | | 110 | 88 |
| 18/LS3/BS10 | 3.3 | 121 | 30 | 1000 | 1.199 | 150 | 101 |

TABLE 15-continued

| Invention Example nr. | Transverse stretch | | | | Density [g/mL] | Thickness | |
|---|---|---|---|---|---|---|---|
| | ratio | temperature [° C.] | time [s] | speed [%/min] | | Measured [μm] | Expected [μm] |
| 18/LS2/BS3 | 3.3 | 123 | 30 | 1000 | | 120 | 93 |
| 18/LS3/BS11 | 3.3 | 128 | 30 | 1000 | 1.221 | 140 | 101 |
| 18/LS3/BS12 | 3.3 | 132 | 30 | 1000 | 1.228 | 140 | 101 |
| 18/LS3/BS13 | 3.3 | 142 | 30 | 1000 | 1.242 | 140 | 101 |
| 18/LS4/BS2 | | 150 | | | | 162 | 108 |
| 18/LS3/BS14 | 3.3 | 153 | 30 | 1000 | 1.235 | 140 | 101 |
| 18/LS3/BS15 | 3.5 | 111 | 30 | 2000 | 1.132 | 140 | 95 |
| 18/LS3/BS16 | | 110 | 10 | 1000 | | 152 | 101 |
| 18/LS3/BS17 | 3.3 | 100 | 30 | 500 | 1.062 | 180 | 101 |
| 18/LS3/BS18 | 3.5 | 100 | 30 | 500 | 1.080 | 190 | 95 |

Biaxial stretching reduced the density of the films with the density decrease being greater the lower the transversal stretching temperature. However, the decrease in density is smaller than would be expect simply based on the measured thicknesses compared with the expected thicknesses based on the extrudate thickness, longitudinal stretch ratio and transversal stretch ratio as observed for non-voided films, which can only be partly explained by the combination of two effects: the decrease in the density due to void forming on the one hand being to a degree compensated by the increase in the crystallinity of the polyester matrix due to biaxial stretching on the other.

Table 16 gives the measured thickness, the expected thickness, i.e. thickness if no void-forming on the basis of the extrudate thickness and the longitudinal and transversal stretch ratios, the optical density measured with a MacBeth TR924 densitometer in transmission mode with a visible filter, the expected optical density, i.e. the optical density calculated using the relationship disclosed in COMPARATIVE EXAMPLE 4 using the theoretical layer thickness values, and the difference between the observed optical density and the optical density expected due to a 2% by weight concentration of the particular titanium dioxide pigment used, ΔOD, together with the temperature at which the transversal stretching was carried out.

TABLE 16

| Example nr. | Stretch temperature [° C.] | Thickness [μm] | Expected thickness [μm] | OD (TR924) | Expected OD | ΔOD | ΔOD/OD | OD (X-rite) |
|---|---|---|---|---|---|---|---|---|
| 18/LS3/BS1 | 86 | 199 | 101 | 1.35 | 0.41 | 0.95 | 0.70 | 1.10 |
| 18/LS3/BS2 | 91 | 185 | 101 | 1.32 | 0.41 | 0.91 | 0.69 | 1.07 |
| 18/LS3/BS3 | 98 | 180 | 101 | 1.28 | 0.41 | 0.87 | 0.68 | 1.03 |
| | | 190 | | 1.36 | | 0.95 | 0.70 | |
| 18/LS3/BS4 | 100 | 165 | 101 | 1.20 | 0.41 | 0.79 | 0.66 | 0.96 |
| 18/LS3/BS5 | 100 | 150 | 101 | 1.22 | 0.41 | 0.81 | 0.66 | 1.00 |
| 18/LS3/BS6 | 100* | 175 | 95 | 1.22 | 0.39 | 0.83 | 0.68 | 0.98 |
| 18/LS3/BS7 | 101 | 105 | 101 | 1.15 | 0.41 | 0.75 | 0.65 | 0.90 |
| 18/LS3/BS8 | 102 | 135 | 101 | 1.08 | 0.41 | 0.67 | 0.62 | 0.81 |
| 18/LS2/BS1 | 106 | 135 | 93 | | 0.38 | | | 1.005 |
| 18/LS3/BS9 | 110 | 150 | 101 | | 0.41 | | | 0.94 |
| 18/LS4/BS1 | 110 | 165 | 108 | 1.18 | 0.44 | 0.74 | 0.63 | 0.91 |
| 18/LS2/BS2 | 113 | 135 | 93 | 1.17 | 0.38 | 0.79 | 0.67 | 0.905 |
| 18/LS1/BS1 | 114 | 110 | 88 | 1.01 | 0.36 | 0.65 | 0.64 | 0.805 |
| 18/LS3/BS10 | 121 | 150 | 101 | 1.14 | 0.41 | 0.73 | 0.64 | 0.89 |
| 18/LS2/BS3 | 123 | 120 | 93 | | 0.38 | | | 0.88 |
| 18/LS3/BS11 | 128 | 140 | 101 | 1.10 | 0.41 | 0.69 | 0.63 | 0.86 |
| 18/LS3/BS12 | 132 | 140 | 101 | 1.10 | 0.41 | 0.69 | 0.63 | 0.85 |
| 18/LS3/BS13 | 142 | 140 | 101 | 1.10 | 0.41 | 0.69 | 0.63 | 0.83 |
| 18/LS4/BS2 | 150 | 162 | 108 | | 0.44 | | | 0.85 |
| 18/LS3/BS17 | 153 | 140 | 101 | 1.10 | 0.41 | 0.69 | 63 | 0.86 |

*stretch ratio = 3.5

It is clear from the results in Table 16 that the degree of void-forming, as indicated by the optical density not attributable to the 2% by weight of titanium dioxide present, increased up to 70% with decreasing transversal stretch temperature regardless of the other conditions pertaining during the transversal stretch process.

Table 17 summarizes the stretch conditions, the thickness, expected thickness based on the extrudate thickness, the longitudinal stretch ratio and the transversal stretch ratio, optical density, expected optical density and non-attributable increase in optical density as a result of void-forming for different films obtained at a stretch temperature of approximately 110° C.

TABLE 17

| Invention example nr. | Transverse stretch | | | Thickness | | OD TR924 | Expected OD | ΔOD | ΔOD/ OD | OD (X-rite) |
|---|---|---|---|---|---|---|---|---|---|---|
| | temperature [° C.] | time [s] | speed [%/min] | measured [μm] | Expected [μm] | | | | | |
| 18/LS3/BS15 | 111 | 30 | 2000 | 140 | 95 | 1.20 | 0.39 | 0.81 | 0.67 | 0.95 |
| 18/LS3/BS9 | 110 | 30 | 1000 | 150 | 101 | | 0.41 | | | 0.94 |
| 18/LS4/BS1 | 110 | 30 | 1000 | 165 | 108 | 1.18 | 0.44 | 0.74 | 0.63 | 0.91 |
| 18/LS3/BS16 | 110 | 10 | 1000 | 152 | 101 | 1.22 | 0.41 | 0.81 | 0.66 | 1.00 |
| 18/LS3/BS17 | 100 | 30 | 500 | 180 | 101 | 1.21 | 0.41 | 0.80 | 0.66 | 0.99 |
| 18/LS3/BS18* | 100 | 30 | 500 | 190 | 95 | 1.23 | 0.39 | 0.84 | 0.68 | 1.01 |

*stretch ratio = 3.5

The data in Table 17 shows that reducing the stretching time from 30 s to 10 s and increasing the stretching speed from 1000%/min to 2000%/min also promote void-forming.

The presence of void-forming was demonstrated for the biaxially stretched film of EXAMPLE 18/LS1/BS1 by clamping the film in an Instron 4411 apparatus and observing the changes in film thickness and optical density upon contacting the film with a soldering iron for 5 s at various temperatures. The results of these experiments are given in Tables 18 and 19.

A reduction in optical density at 150° C. of 0.42 was observed for the film of EXAMPLE 18/LS1/BS1 corresponding to 25% accompanied by a reduction of 26% in layer thickness.

TABLE 18

| Invention Example nr | OD before heating | OD (TR924) after heating for 5 s at a pressure of 0.5 N/mm² at | | | | | ΔOD at 150° C. | % decrease in OD |
|---|---|---|---|---|---|---|---|---|
| | | 122° C. | 130° C. | 150° C. | 170° C. | 190° C. | | |
| 18/LS3/BS1 | 1.36 | 1.18 | 1.12 | 1.02 | 0.82 | 0.72 | 0.42 | 25 |

TABLE 19

| EXAMPLE nr | Film thickness before heating [μm] | Film thickness [μm] after heating for 5 s at a pressure of 0.5 N/mm² at | | | | |
|---|---|---|---|---|---|---|
| | | 122° C. | 130° C. | 150° C. | 170° C. | 190° C. |
| 18/LS3/BS1 | 199 | 163 | 157 | 147 | 139 | 145 |

Comparative Example 6 and Invention Examples 19 to 22

The ca. 1100 μm thick extrudates of COMPARATIVE EXAMPLE 6 and INVENTION EXAMPLES 19 to 22 all with 2% by weight of titanium dioxide and 15% by weight of SAN were produced as described for COMPARATIVE EXAMPLES 1 to 3 with 15% by weight of SAN or 15% by weight of ABS (MAGNUM 8391) and different weight ratios of PET02 and PET04 as summarized in Table 20.

TABLE 20

|  | IPA:TPA ratio | PET02 [wt %] | PET04 [wt %] | MAGNUM 8391 [% by wt] | SAN 06 [wt %] | UVITEX OB-one [ppm] | $TiO_2$ [wt %] |
|---|---|---|---|---|---|---|---|
| Comparative example nr. | | | | | | | |
| 6 | 0 | 83 | 0 | 15 | — | — | 2.0 |
| Invention example nr. | | | | | | | |
| 19 | 0.0401 | 32 | 51 | — | 15 | 100 | 2.0 |
| 20 | 0.0530 | 41.2 | 41.8 | — | 15 | 100 | 2.0 |
| 21 | 0.0650 | 32.3 | 50.7 | — | 15 | 100 | 2.0 |
| 22 | 0.1111 | — | 83 | — | 15 | 100 | 2.0 |

Stretching in the length direction was carried out for each extrudate as described in COMPARATIVE EXAMPLES 1 to 3 under the conditions given in Table 21. The expected thickness is the thickness based on the extrudate thickness and longitudinal as observed for non-voided films.

TABLE 21

|  | IPA:TPA ratio | longitudinal stretch | | | Thickness | | OD TR924 | Expected OD | ΔOD | ΔOD/OD | OD [X-rite] |
|---|---|---|---|---|---|---|---|---|---|---|---|
|  |  | ratio | force [N/mm²] | temperature [°C.] | Measured [μm] | Expected [μm] | | | | | |
| Comparative example nr. | | | | | | | | | | | |
| 6/LS1 | 0 | 3.6 | 8 | — | 318 | 305 | 0.84 | 0.84 | 0.00 |  | 0.60 |
| Invention example nr | | | | | | | | | | | |
| 19/LS1 | 0.0401 | 3.6 | 8.23 | 114 | 330 | 305 | 1.26 | 0.84 | 0.42 | 0.33 | 0.96 |
| 20/LS1* | 0.0530 | 3.3 | 7.97 |  | 375 | 333 | 1.08 | 0.87 | 0.21 | 0.19 | 0.96 |
| 20/LS2* | 0.0530 | 3.3 | 7.14 |  |  | 333 | 0.948 | 0.87 | 0.078 | 0.08 | 0.86 |
| 20/LS3* | 0.0530 | 3.3 | 9.67 |  |  | 333 | 1.19 | 0.87 | 0.32 | 0.27 | 1.09 |
| 21/LS1 | 0.0650 | 3.8 | 8.3 | 120 | 300 | 290 |  | 0.82 |  |  | 0.94 |
| 21/LS2 | 0.0650 | 3.6 | 8.23 | 96 | 330 | 305 |  | 0.84 |  |  | 0.96 |
| 21/LS3 | 0.0650 | 3.3 | 8.6 | 90 | 365 | 333 |  | 0.87 |  |  |  |
| 21/LS4 | 0.0650 | 3.1 | 8.2 | 80 | 380 | 355 |  | 0.90 |  |  |  |
| 22/LS1 | 0.1111 | 3.85 | 8 | — | 320 | 286 | 1.24 | 0.81 | 0.43 | 0.35 | 1.00 |

*stretching speed 4.0 m/min

Transversal stretching was then performed on the longitudinally stretched films with a stretch time of 30 s and stretching speed of 1000%/min as under the conditions given in Table 22. The measured thickness, the expected thickness, i.e. thickness if no void-forming on the basis of the extrudate thickness and the longitudinal and transversal stretch ratios, the measured optical density with the MacBeth TR924 densitometer in transmission mode with a visible filter, the expected optical density, i.e. the optical density calculated using the relationship disclosed in COMPARATIVE EXAMPLE 4 using the theoretical layer thickness values, and the difference between the observed optical density and the optical density expected due to a 2% by weight concentration of the particular titanium dioxide pigment used, ΔOD, are also given in Table 22.

The increase in optical density due to void-forming clearly increased as IPA:TPA ratio in the linear polyester continuous phase increased from 0 for COMPARATIVE EXAMPLE 6/LS1/BS1 with a contribution of 50% to the optical density to 0.111 for INVENTION EXAMPLE 22/LS1/BS1 with a contribution of 71% to the optical density.

TABLE 22

| | IPA:TPA ratio | Transverse stretch ratio | temperature [° C.] | Density [g/mL] | Thickness Measured [μm] | Expected [μm] | OD TR924 | Expected OD | ΔOD | ΔOD/OD |
|---|---|---|---|---|---|---|---|---|---|---|
| Comparative example nr. | | | | | | | | | | |
| 6/LS1/BS1 | 0 | 3.3 | 112 | | 65 / 85 | 88 | 0.73 | 0.36 | 0.37 | 0.50 |
| Invention example nr | | | | | | | | | | |
| 19/LS1/BS1 | 0.0401 | 3.3 | 110 | | 125 | 101 | 1.10 | 0.41 | 0.69 | 0.63 |
| 20/LS1/BS1 | 0.0530 | 3.5 | 115 | 1.19 | 140 | 95 | 0.925 | 0.39 | 0.535 | 0.58 |
| 20/LS1/BS2 | 0.0530 | 3.5 | 100 | 1.08 | 116 | 95 | 1.05 | 0.39 | 0.66 | 0.63 |
| 20/LS2/BS1 | 0.0530 | 3.5 | 100 | 1.17 | 123 | 95 | 1.01 | 0.39 | 0.62 | 0.61 |
| 21/LS1/BS1 | 0.0650 | 3.3 | 114 | | 110 | 88 | 1.01 | 0.36 | 0.65 | 0.64 |
| 21/LS2/BS1 | 0.0650 | 3.3 | 113 | | 135 | 93 | 1.17 | 0.38 | 0.69 | 0.59 |
| 21/LS3/BS1* | 0.0650 | 3.5 | 111 | 1.132 | 140 | 95 | 1.20 | 0.39 | 0.81 | 0.67 |
| 21/LS4/BS1 | 0.0650 | 3.3 | 110 | | 165 | 108 | 1.18 | 0.44 | 0.74 | 0.63 |
| 22/LS1/BS1 | 0.1111 | 3.3 | 110 | 1.121 | 100 | 87 | 1.20 | 0.35 | 0.85 | 0.71 |

*stretching speed of 2000%/min

The elasticity (Young's) modulus and yield stress of the biaxially stretched extrudates were measured for INVENTION EXAMPLES 20/LS1/BS1, 20/LS1/BS2 and 20/LS2/BS1 and the results are summarized in Table 23 below:

TABLE 23

| | Elasticity modulus [N/mm$^2$] | | Yield stress [N/mm$^2$] | |
|---|---|---|---|---|
| | longitudinal direction | transversal direction | longitudinal direction | transversal direction |
| 20/LS1/BS1 | 2908 | 4470 | 65.7 | 121 |
| 20/LS1/BS2 | 2594 | 3742 | 56.3 | 103.4 |
| 20/LS2/BS1 | 2965 | 4410 | 62.2 | 125.9 |

The presence of void-forming was demonstrated for the biaxially stretched film of COMPARATIVE EXAMPLE 6/LS1/BS1 by clamping the film in an Instron 4411 apparatus and observing the change in film thickness and optical density upon contacting the film with a soldering iron for 5 s at 150° C. The results of these experiments are given in Table 24.

TABLE 24

| | before heating | | after heating at 150° C. for 5 s at pressure of 0.5 N/mm$^2$ | | Change in | |
|---|---|---|---|---|---|---|
| Comparative example nr. | OD (TR924) | Thickness [μm] | OD (TR924) | thickness [μm] | ΔOD [%] | thickness [μm] |
| 6/LS1/BS1 | 0.73 | 85 | 0.54 | 79 | 26 | 6 |

The presence of void-forming was demonstrated for the biaxially stretched films of INVENTION EXAMPLES 19/LS1/BS1 and 22/LS1/BS1 by clamping the films in an Instron 4411 apparatus and observing the changes in film thickness and optical density upon contacting the film with a soldering iron for 5 s at various temperatures. The results of these experiments are given in Tables 25 and 26.

Reductions in optical density at 150° C. of 0.19, 0.42 and 0.60 were observed for the films of COMPARATIVE EXAMPLE 6/LS1/BS1, INVENTION EXAMPLE 19/LS1/BS1 and 22/LS1/BS1 respectively corresponding to 26, 38 and 50%, again reflecting the impact of the IPA:TPA ratio being 0, 0.0401 and 0.111 respectively.

TABLE 25

| Invention example nr | OD before heating | OD (TR924) after heating for 5 s at a pressure of 0.5 N/mm² at | | | | | ΔOD at 150° C. | % decrease in OD |
|---|---|---|---|---|---|---|---|---|
| | | 122° C. | 130° C. | 150° C. | 170° C. | 190° C. | | |
| 19/LS1/BS1 | 1.10 | 0.84 | 0.83 | 0.68 | 0.62 | 0.57 | 0.42 | 38 |
| 22/LS1/BS1 | 1.19 | 0.86 | 0.78 | 0.60 | 0.50 | — | 0.60 | 50 |

TABLE 26

| Invention example nr | Layer thickness before heating [μm] | Layer thickness [μm] after heating for 5 s at a pressure of 0.5 N/mm² at | | | | |
|---|---|---|---|---|---|---|
| | | 122° C. | 130° C. | 150° C. | 170° C. | 190° C. |
| 19/LS1/BS1 | 125 | 117 | 117 | 113 | 106 | 84 |
| 22/LS1/BS1 | 100 | 94 | 88 | 81 | 73 | — |

TABLE 27

| Invention example nr | IPA:TPA ratio | PET02 [wt %] | PET04 [wt %] | SAN 06 [wt %] | Magnesium acetate [ppm] | UVITEX OB-one [ppm] |
|---|---|---|---|---|---|---|
| 23 | 0.0314 | 57.7 | 25.3 | 17 | — | 100 |
| 24 | 0.0747 | 25.3 | 57.7 | 17 | — | 100 |
| 25 | 0.111 | — | 85.0 | 15 | 33 | — |

Stretching in the length direction was carried out for each extrudate as described in COMPARATIVE EXAMPLES 1 to 3 under the conditions given in Table 28. The expected thickness is the thickness observed for non-voided films.

The optical density values for INVENTION EXAMPLES 24/LS1, 24/LS2 and 24/LS3 clearly show the impact of the longitudinal stretching force with the highest optical density value of 1.06 being obtained with the film of INVENTION EXAMPLE 24/LS2 with the highest longitudinal stretching force of 8.65 N/mm² compared with 0.97 and 0.78 obtained with the films of INVENTION EXAMPLE 24/LS1 and 24/LS3 respectively with longitudinal stretching forces of 8.44 N/mm² and 6.36 N/mm² respectively.

Invention Examples 23 to 25

The ca. 1100 μm thick extrudates of INVENTION EXAMPLES 23 to 25 of unpigmented dispersions of SAN 06 in aromatic polyester were produced as described for COMPARATIVE EXAMPLES 1 to 3 with different concentrations of SAN 06, TO4 and PET04 as summarized in Table 27.

Transversal stretching was then performed on the longitudinally stretched films with a stretch time of 30 s and stretching speed of 1000%/min under the conditions given in Table 29. Table 29 also gives the measured thickness, the expected thickness, i.e. thickness if no void-forming on the basis of the extrudate thickness and the longitudinal and transversal stretch ratios, the measured optical density with the MacBeth TR924 densitometer in transmission mode with a visible filter, the expected optical density, i.e. 0.05 the optical density of polyethylene terephthalate being almost completely determined by refraction effects at the two sides of the film, and the difference between the observed optical density and the optical density expected due to the aromatic polyester, ΔOD.

TABLE 28

| Invention example nr. | IPA:TPA ratio | Longitudinal stretch | | Thickness | | OD TR924 | Expected OD | ΔOD | ΔOD/ OD | OD [X-rite] |
|---|---|---|---|---|---|---|---|---|---|---|
| | | ratio | force [N/mm²] | temperature [° C.] | Measured [μm] | Expected [μm] | | | | |
| 23/LS1 | 0.0314 | 3.8 | 8.21 | 175 | 301 | 289 | 0.80 | 0.05 | 0.75 | 0.94 | 0.47 |
| 23/LS2 | 0.0314 | 3.6 | 8.65 | 142 | 320 | 305 | 0.72 | 0.05 | 0.67 | 0.93 | 0.47 |
| 24/LS1 | 0.0747 | 3.8 | 8.44 | 116 | 298 | 289 | 0.97 | 0.05 | 0.92 | 0.95 | 0.77 |
| 24/LS2 | 0.0747 | 3.6 | 8.65 | 97 | 330 | 305 | 1.06 | 0.05 | 1.01 | 0.95 | 0.85 |
| 24/LS3 | 0.0747 | 3.35 | 6.36 | 119 | 320 | 328 | 0.78 | 0.05 | 0.73 | 0.93 | 0.60 |
| 25/LS1 | 0.1111 | 3.3 | 8.0 | 89 | | | 1.00 | 0.05 | 0.95 | 0.95 | |
| 25/LS2 | 0.1111 | 3.3 | 9.5 | 80 | | | 1.14 | 0.05 | 1.09 | 0.96 | |

The optical density values for INVENTION EXAMPLES 25/LS1 and 25/LS2 also show the impact of the longitudinal stretching force with the highest optical density value of 1.14 being obtained with the film of INVENTION EXAMPLE 25/LS2 with the higher longitudinal stretching force of 9.5 N/mm² compared with 1.00 obtained with the film of INVENTION EXAMPLE 25/LS2 with a longitudinal stretching force of 8.0 N/mm².

The results in Table 29 show strongly increased opacification optical densities of 1.28 and 1.29 due to void-forming for the films of INVENTION EXAMPLES 25/LS2/BS4 and 25/LS2/BS5 with a linear polyester matrix with an IPA:TPA ratio of 0.111 compared with an opacification optical density of 0.78 due to void forming for the film of INVENTION EXAMPLE 23/LS2/BS1 with a linear polyester matrix with an IPA:TPA ratio of 0.0314.

TABLE 29

| Invention example nr. | IPA:TPA ratio | Transverse stretch ratio | Transverse stretch temperature [° C.] | Thickness Measured [μm] | Thickness Expected μm | OD TR924 | Expected OD | ΔOD | ΔOD/OD |
|---|---|---|---|---|---|---|---|---|---|
| 23/LS2/BS1 | 0.0314 | 3.3 | 124 | 82 | 92 | 0.83 | 0.05 | 0.78 | 0.94 |
| 24/LS1/BS1 | 0.0747 | 3.3 | 120 | 97 | 88 | 0.99 | 0.05 | 0.94 | 0.95 |
| 24/LS2/BS1 | 0.0747 | 3.3 | 120 | 123 | 92 | 1.04 | 0.05 | 0.99 | 0.95 |
| 25/LS1/BS1 | 0.111 | 3.5 | 90 | 165 | 95 | 1.08 | 0.05 | 1.03 | 0.95 |
| 25/LS1/BS2 | 0.111 | 3.5 | 88 | 175 | 95 | 1.10 | 0.05 | 1.05 | 0.95 |
| 25/LS1/BS3 | 0.111 | 3.5 | 85 | 172 | 95 | 1.15 | 0.05 | 1.10 | 0.96 |
| 25/LS1/BS4 | 0.111 | 3.5 | 82 | 195 | 95 | 1.20 | 0.05 | 1.15 | 0.96 |
| 25/LS2/BS1 | 0.111 | 3.5 | 94 | 227 | 95 | 1.22 | 0.05 | 1.17 | 0.96 |
| 25/LS2/BS2 | 0.111 | 3.5 | 85 | 228 | 95 | 1.30 | 0.05 | 1.25 | 0.96 |
| 25/LS2/BS3 | 0.111 | 3.5 | 81 | 227 | 95 | 1.30 | 0.05 | 1.25 | 0.96 |
| 25/LS2/BS4 | 0.111 | 3.5 | 77 | 235 | 95 | 1.34 | 0.05 | 1.29 | 0.96 |
| 25/LS2/BS5 | 0.111 | 3.5 | 75 | 232 | 95 | 1.33 | 0.05 | 1.28 | 0.96 |

The presence of void-forming was demonstrated for the biaxially stretched films of INVENTION EXAMPLES 23/LS2/BS1, 24/LS1/BS1 and 24/LS2/BS1 and the INVENTION EXAMPLE 25 series by clamping the films in an Instron 4411 apparatus and observing the changes in film thickness and optical density upon contacting the film with a soldering iron for 5 s at various temperatures. The results of these experiments are given in Tables 30 and 31.

TABLE 30

| Invention Example nr | OD before heating | OD (TR924) after heating for 5 s at a pressure of 0.5 N/mm² at 122° C. | 130° C. | 150° C. | 170° C. | 190° C. | ΔOD at 170° C. | % decrease in OD |
|---|---|---|---|---|---|---|---|---|
| 23/LS2/BS1 | 0.83 | 0.45 | 0.38 | 0.19 | 0.16 | 0.18 | 0.67 | 81 |
| 24/LS1/BS1 | 0.99 | 0.49 | 0.42 | 0.22 | 0.14 | 0.13 | 0.85 | 86 |
| 24/LS2/BS1 | 1.04 | 0.67 | 0.44 | 0.22 | 0.16 | 0.13 | 0.88 | 85 |
| 25/LS1/BS1 | 1.10 | — | — | — | 0.23 | 0.17 | 0.87 | 79 |
|  | 1.08 |  |  |  | 0.17 | 0.14 | 0.91 | 84 |
| 25/LS1/BS2 | 1.11 | — | — | — | 0.18 | 0.17 | 0.93 | 84 |
| 25/LS1/BS3 | 1.12 | — | — | — | 0.25 | 0.19 | 0.87 | 78 |
| 25/LS1/BS4 | 1.10 | — | — | — | 0.23 | 0.22 | 0.87 | 79 |
| 25/LS2/BS1 | 1.29 | — | — | — | 0.30 | 0.19 | 0.99 | 77 |
| 25/LS2/BS2 | 1.32 | — | — | — | 0.32 | 0.16 | 1.00 | 76 |
|  | 1.12 |  |  |  | 0.17 | 0.20 | 0.92 | 82 |
| 25/LS2/BS3 | 1.33 | — | — | — | 0.32 | 0.22 | 1.01 | 76 |
| 25/LS2/BS4 | 1.32 | — | — | — | 0.48 | 0.16 | 0.84 | 64 |
| 25/LS2/BS5 | 1.32 | — | — | — | 0.35 | — | 0.97 | 72 |

TABLE 31

| Invention Example nr | Film thickness before heating [μm] | Film thickness [μm] after heating for 5 s at a pressure of 0.5 N/mm² at 122° C. | 130° C. | 150° C. | 170° C. | 190° C. | Δ thickness at 170° C. | % decrease in thickness |
|---|---|---|---|---|---|---|---|---|
| 23/LS2/BS1 | 82 | 83 | 80 | 74 | 71 | 76 | 11 | 13 |
| 24/LS1/BS1 | 97 | 97 | 91 | 87 | 81 | 67 | 16 | 16 |
| 24/LS2/BS1 | 123 | 118 | 114 | 105 | 99 | 74 | 24 | 19 |
| 25/LS1/BS1 | 164 | — | — | — | 118 | 118 | 46 | 28 |
|  | 163 |  |  |  | 122 | 98 | 41 | 25 |
| 25/LS1/BS2 | 170 | — | — | — | 121 | 91 | 49 | 29 |
| 25/LS1/BS3 | 158 | — | — | — | 119 | 101 | 39 | 25 |
| 25/LS1/BS4 | 194 | — | — | — | 140 | 140 | 54 | 28 |
| 25/LS2/BS1 | 209 | — | — | — | 142 | 135 | 67 | 32 |
| 25/LS2/BS2 | 220 | — | — | — | 141 | 104 | 79 | 36 |
| 25/LS2/BS3 | 216 | — | — | — | 138 | 111 | 78 | 36 |
| 25/LS2/BS4 | 219 | — | — | — | 148 | 92 | 71 | 32 |
| 25/LS2/BS5 | 216 | — | — | — | 139 | — | 77 | 36 |

A reduction in optical density at 190° C. of 0.67 was observed for the film of INVENTION EXAMPLE 23/LS2/BS1 corresponding to 81%, whereas reductions in optical density of 0.85 and 0.88 were observed for the films of INVENTION EXAMPLES 24/LS1/BS1 and 24/LS2/BS1 corresponding to 86 and 85% respectively. In the INVENTION 24 series the reduction in optical density at 190° C. varied between 0.84 and 1.01 corresponding to 64 to 84%.

These reductions in optical density were accompanied by a reduction in layer thickness of 13% for the film of INVENTION EXAMPLE 23/LS2/BS1 and reductions of 16 and 19% in layer thickness for the films of INVENTION EXAMPLES 24/LS1/BS1 and 24/LS2/BS1 with 25 to 36% reduction in thickness being observed for the INVENTION EXAMPLE 25 series. These results show an extremely large reduction in optical density of up to 1.01 upon transparentizing polyester layers with 15 or 17 wt % SAN 06.

Example 26

The ca. 1100 μm thick extrudate of EXAMPLE 26 with 2% by weight of titanium dioxide, 15% by weight of TPX® DX820, poly(4-methyl-pentene), 33.3% by weight of PET02 and 49.7% by weight of PET04 having an IPA:TPA molar ratio of 0.0636 was produced as described for EXAMPLES 1 to 58. Stretching in the length direction was carried out for each extrudate as described in EXAMPLES 1 to 58 under the conditions given in Table 32. The expected thickness is based on the extrudate thickness observed for non-voided films.

TABLE 32

| Example nr. | Longitudinal stretch | | | | Thickness | | OD TR924 | Expected OD | ΔOD | ΔOD/ OD | OD [X-rite] |
|---|---|---|---|---|---|---|---|---|---|---|---|
| | Ratio | Force [N/mm²] | Temperature [° C.] | Density [g/mL] | Measured [μm] | Expected [μm] | | | | | |
| 26/BS1* | 3.3 | 5.21 | | 1.147 | 500 | 333 | 1.10 | 0.87 | 0.23 | 0.21 | 0.96 |

*stretch speed = 4.0 m/min

Transversal stretching was then performed on the longitudinally stretched film with a stretch time of 30 s and stretching speed of 1000%/min under the conditions given in Table 33. Table 33 also gives the measured thickness, the expected thickness, i.e. thickness if no void-forming on the basis of the extrudate thickness and the longitudinal and transversal stretch ratios, the measured optical density with the MacBeth TR924 densitometer in transmission mode with a visible filter, the expected optical density and the difference between the observed optical density and the optical density expected due to the aromatic polyester, ΔOD.

TABLE 33

| Example nr. | Transversal stretch | | | Thickness | | OD TR924 | Expected OD | ΔOD | ΔOD/ OD |
|---|---|---|---|---|---|---|---|---|---|
| | ratio | temperature [° C.] | Density [g/mL] | Measured [μm] | Expected [μm] | | | | |
| 26/LS1/BS1 | 3.5 | 100 | 0.64 | 270 | 95 | 1.08 | 0.39 | 0.69 | 0.64 |

The results in Table 33 clearly show very substantial opacification, 64% of the optical density realized being due to void-forming with a matrix of PET04 with TPX as crystalline dispersed phase with a particle size of ca. 10 μm. However, the elasticity (Young's) modulus in the longitudinal direction at 1258 N/mm² and the yield stress in the longitudinal direction at 26.4 N/mm² were substantially lower than for materials using SAN as opacity-producing agent, see results for INVENTION EXAMPLES 20/LS1/BS1, 20/LS1/BS2 and 20/LS2/BS1.

The present invention may include any feature or combination of features disclosed herein either implicitly or explicitly or any generalisation thereof. In view of the foregoing description it will be evident to a person skilled in the art that various modifications may be made within the scope of the invention.

Having described in detail preferred embodiments of the current invention, it will now be apparent to those skilled in the art that numerous modifications can be made therein without departing from the scope of the invention as defined in the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. A process for producing a non-transparent microvoided self-supporting film comprising the steps of: i) mixing at least one linear polyester having together monomer units consisting essentially of terephthalate, isophthalate and aliphatic dimethylene with a molar ratio of isophthalate monomer units to terephthalate monomer units being at least 0.02 to provide a linear polyester matrix; at least one amorphous high polymer with a higher glass transition temperature than a glass transition temperature of said linear polyester matrix and/or at least one crystalline high polymer having a higher melting point than the glass transition temperature of said linear polyester matrix; and optionally at least one ingredient selected from the group consisting of inorganic opacifying pigments, whitening agents, UV-absorbers, light stabilizers, antioxidants, flame retardants and colorants in a kneader or an extruder; ii) forming the mixture produced in step i) into a thick film followed by quenching; iii) longitudinally stretching the thick film at a stretching force of >4 N/mm² to at least twice the initial length; and iv) transversely stretching the longitudinally stretched film from step (iii) to at least twice its initial width.

2. The process according to claim 1, wherein said longitudinal stretching force is >5 N/m².

3. The process according to claim 1, wherein said transverse stretching is performed with a force >4 N/m².

4. The process according to claim 1, wherein said transverse stretching is at temperature not more than 40° C. above the glass transition temperature of the linear polyester matrix.

5. The process according to claim 1, wherein said molar ratio of isophthalate monomer units to terephthalate monomer units is at least 0.065.

6. The process according to claim 1, wherein said molar ratio of isophthalate monomer units to terephthalate monomer units is at least 0.11.

7. The process according to claim 1, wherein said molar ratio of isophthalate monomer units to terephthalate monomer units is 0.50 or less.

8. The process according to claim 1, wherein a concentration of said amorphous high polymer or said crystalline high polymer in said non-transparent microvoided self-supporting film is 5 to 35% by weight.

9. The process according to claim 1, wherein said amorphous high polymer is crosslinked or non-crosslinked.

10. The process according to claim 1, wherein said amorphous high polymer comprises at least one chain-polymerized block.

11. The process according to claim 10, wherein said at least one chain-polymerized block is selected from the group consisting of polystyrene, styrene copolymers, SAN-polymers, polyacrylates, acrylate-copolymers, polymethacrylates and methacrylate-copolymers.

12. The process according to claim 11, wherein said styrene copolymers are selected from the group consisting of SAN-polymers and ABS-polymers.

13. The process according to claim 12, wherein a concentration of AN-monomer units in said SAN-polymer is 15 to 35% by weight.

14. The process according to claim 12, wherein a weight ratio of said linear polyester to said SAN-polymer is in the range of 2.0:1 to 9.0:1.

15. The process according to claim 1, wherein said amorphous high polymer is exclusive of a cellulose ester.

16. The process according to claim 1, wherein said inorganic opacifying pigment is selected from the group consisting of silica, zinc oxide, zinc sulphide, lithopone, barium sulphate, calcium carbonate, titanium dioxide, aluminum phosphate and clays.

17. The process according to claim 1, wherein said non-transparent microvoided self-supporting film comprises ≦5% by weight of inorganic opacifying pigment.

18. The process according to claim 1, wherein said linear polyester matrix comprises at least two linear polyester resins.

* * * * *